(12) United States Patent
Chande et al.

(10) Patent No.: US 12,133,258 B2
(45) Date of Patent: Oct. 29, 2024

(54) CHANNEL OCCUPANCY TIME (COT) SHARING UNDER HETEROGENEOUS BANDWIDTH CONDITIONS

(71) Applicant: QUALCOMM Incorporated, San Diego, CA (US)

(72) Inventors: Vinay Chande, San Diego, CA (US); Arumugam Chendamarai Kannan, San Diego, CA (US); Srinivas Yerramalli, San Diego, CA (US); Giovanni Chisci, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/395,371

(22) Filed: Aug. 5, 2021

(65) Prior Publication Data
US 2022/0053562 A1 Feb. 17, 2022

Related U.S. Application Data

(60) Provisional application No. 63/064,382, filed on Aug. 11, 2020.

(51) Int. Cl.
*H04W 74/0816* (2024.01)
*H04W 72/0453* (2023.01)
*H04W 74/00* (2009.01)

(52) U.S. Cl.
CPC ... *H04W 74/0816* (2013.01); *H04W 72/0453* (2013.01); *H04W 74/004* (2013.01); *H04W 74/006* (2013.01)

(58) Field of Classification Search
CPC ......... H04W 74/0816; H04W 72/0453; H04W 74/004; H04W 74/006
See application file for complete search history.

(56) References Cited

U.S. PATENT DOCUMENTS

| 2018/0242364 | A1* | 8/2018 | Park | ............... H04W 88/08 |
| 2019/0059104 | A1 | 2/2019 | Gu et al. | |

(Continued)

FOREIGN PATENT DOCUMENTS

WO 2019160741 A1 8/2019

OTHER PUBLICATIONS

Futurewei: "Channelization in Unlicensed Spectrum above 52 .6GHZ and below 71GHZ", 3GPP TSG RAN WG1 Meeting #101-e, 3GPP Draft, R1-2003286, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020 (May 15, 2020), 5 Pages, XP051885081, URL: https://www.3gpp.org/ftp/tsg_ran/WG1_RL1/TSGR1_101-e/Docs/R1-2003286.zip, R1-2003286.docx, [retrieved on May 15, 2020], Paragraph [0004].

(Continued)

*Primary Examiner* — Kevin M Cunningham
(74) *Attorney, Agent, or Firm* — QUALCOMM Incorporated

(57) ABSTRACT

The present disclosure relates to methods and devices for wireless communication including an apparatus, e.g., a UE and/or a base station. In one aspect, the apparatus may determine a CCA threshold corresponding to at least one bandwidth, the at least one bandwidth being associated with a COT sharing procedure. The apparatus may also adjust the CCA threshold corresponding to the at least one bandwidth based on at least one of one or more sensing bandwidths or one or more granted resources for the COT sharing proce- (Continued)

dure. Additionally, the apparatus may signal the adjusted CCA threshold corresponding to the at least one bandwidth to at least one of a node or a base station.

26 Claims, 14 Drawing Sheets

(56) References Cited

U.S. PATENT DOCUMENTS

| | | | |
|---|---|---|---|
| 2019/0230706 A1* | 7/2019 | Li | H04B 7/088 |
| 2020/0305184 A1* | 9/2020 | Kim | H04W 74/0833 |
| 2021/0195642 A1 | 6/2021 | Chen et al. | |
| 2021/0195643 A1* | 6/2021 | Talarico | H04W 74/0816 |
| 2022/0159687 A1* | 5/2022 | Myung | H04L 5/0053 |

OTHER PUBLICATIONS

Intel Corporation: "Enhancements to Configured Grants for NR-Unlicensed", Draft; 3GPP TSG RAN WG1 Meeting AH 1901, R1-1900473—Intel NR-U Configured Grants, 3rd Generation Partnership Project (3GPP), Mobile Competence Centre; 650, Route Des Lucioles; F-06921 Sophia-Antipolis Cedex; France, vol. RAN WG1, No. Taipei, Taiwan; Jan. 21, 2019-Jan. 25, 2019, Jan. 20, 2019 (Jan. 20, 2019), pp. 1-7, URL: http://www.3gpp.org/ftp/Meetings%5F3GPP%5FSYNC/RAN1/Docs/R1%2D1900473%2Ezip, [retrieved on Jan. 20, 2019], The whole document, paragraph [02.5].

International Search Report and Written Opinion—PCT/US2021/045114—ISA/EPO—Dec. 8, 2021.

European Search Report—EP24180099—Search Authority—The Hague—Jun. 26, 2024.

* cited by examiner

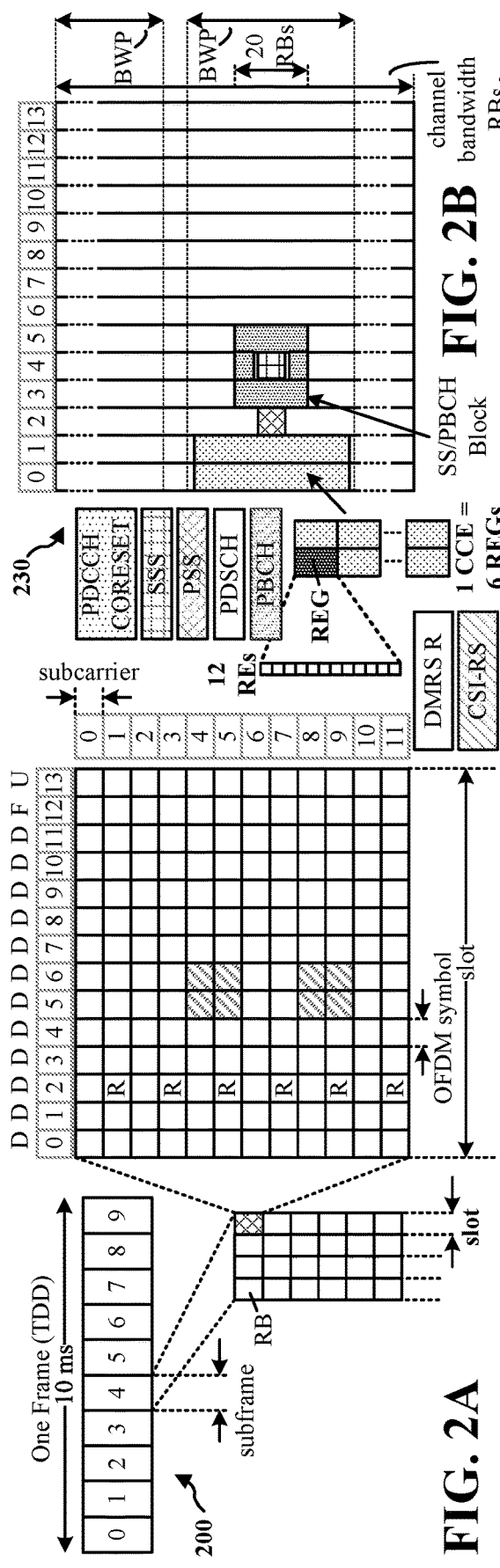
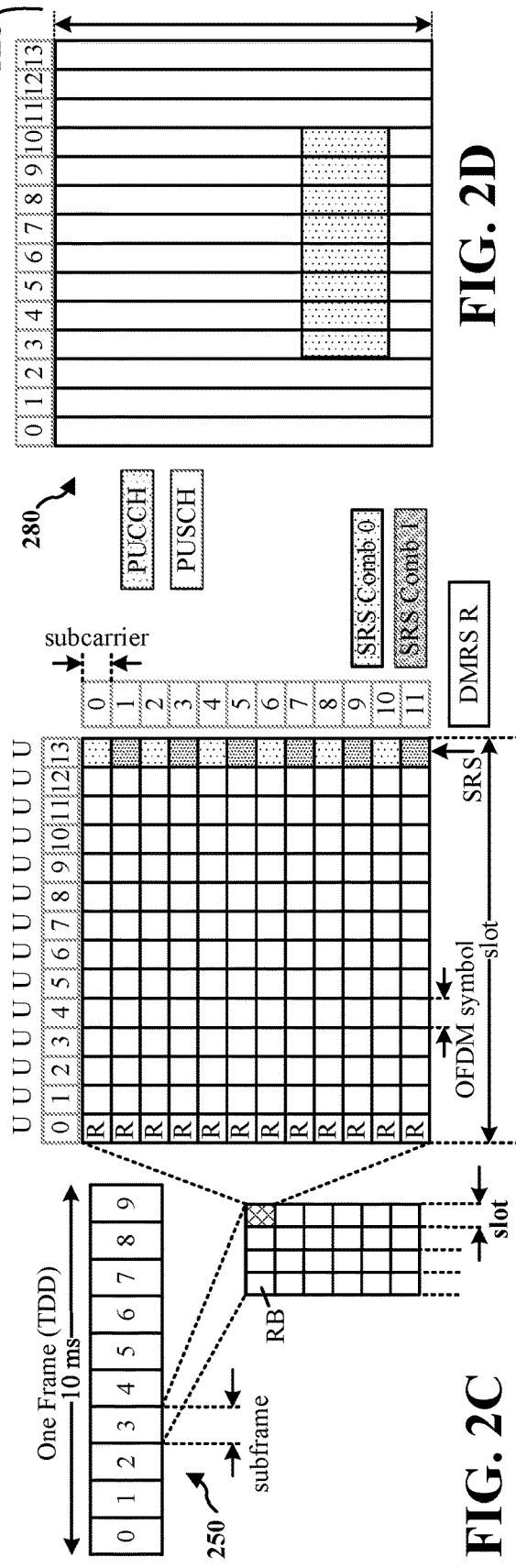
FIG. 2A
FIG. 2B
FIG. 2C
FIG. 2D

CHANNEL OCCUPANCY TIME (COT) SHARING UNDER HETEROGENEOUS BANDWIDTH CONDITIONS

CROSS REFERENCE TO RELATED APPLICATION(S)

This application claims the benefit of U.S. Provisional Application Ser. No. 63/064,382, entitled "CHANNEL OCCUPANCY TIME (COT) SHARING UNDER HETEROGENEOUS BANDWIDTH CONDITIONS" and filed on Aug. 11, 2020, which is expressly incorporated by reference herein in its entirety.

TECHNICAL FIELD

The present disclosure relates generally to communication systems, and more particularly, to channel occupancy time (COT) sharing procedures under heterogeneous bandwidth conditions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

During the operations of NR in an unlicensed spectrum, a base station (BS) may acquire a medium by performing a category 4 (CAT4) listen-before-talk (LBT) procedure, such as a clear channel assessment (CCA), prior to communicating in order to determine whether the shared channel is available. A CCA may include an energy detection procedure based on a threshold to determine whether there are any other active transmissions. The BS may reserve the medium for a period of time, which may be referred to as channel occupancy time (COT). For example, a BS may acquire a COT in the medium; transmit downlink (DL) traffic to the user equipment (UE) during the COT and share the COT with the UE so that the UE may also transmit uplink (UL) traffic to the BS during the BS's COT. Prior to each UL transmission during the BS's COT, the UE may perform a category 2 (CAT2) LBT. However, in some instances, the UL transmission (e.g., UL control traffic) may use a smaller bandwidth than the DL transmission. As such, adjusting the CCA threshold and signaling the adjustment may be advantageous. A COT sharing procedure may be initiated with at least one of the node, the BS, or the UE with one or more granted resources configured for the COT sharing procedure.

In an aspect of the disclosure, a method, a computer-readable medium, and an apparatus are provided. The apparatus may be a user equipment (UE). The apparatus may determine a CCA threshold corresponding to at least one bandwidth associated with the COT sharing procedure. The apparatus may also adjust the CCA threshold corresponding to the at least one bandwidth based on at least one of one or more sensing bandwidths or one or more granted resources for the COT sharing procedure. Additionally, the apparatus may calculate a difference between a UE sensing bandwidth of the one or more sensing bandwidths and a base station sensing bandwidth of the one or more sensing bandwidths. The apparatus may also adjust the at least one bandwidth based on the calculated difference between the UE sensing bandwidth and the base station sensing bandwidth. The apparatus may also signal the adjusted CCA threshold to the at least one of a node or the BS.

In another aspect of the disclosure, a method, a computer-readable medium, and an apparatus are provided. The apparatus may be a base station. The apparatus may determine a CCA threshold corresponding to at least one bandwidth, the at least one bandwidth being associated with a COT sharing procedure. The apparatus may also adjust the CCA threshold corresponding to the at least one bandwidth based on at least one of one or more sensing bandwidths or one or more granted resources for the COT sharing procedure. Additionally, the apparatus may calculate a difference between a UE sensing bandwidth of the one or more sensing bandwidths and a base station sensing bandwidth of the one or more sensing bandwidths. The apparatus may also adjust the at least one bandwidth based on the calculated difference between the UE sensing bandwidth and the base station sensing bandwidth. The apparatus may also signal the adjusted CCA threshold corresponding to the at least one bandwidth to at least one of a node or a UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
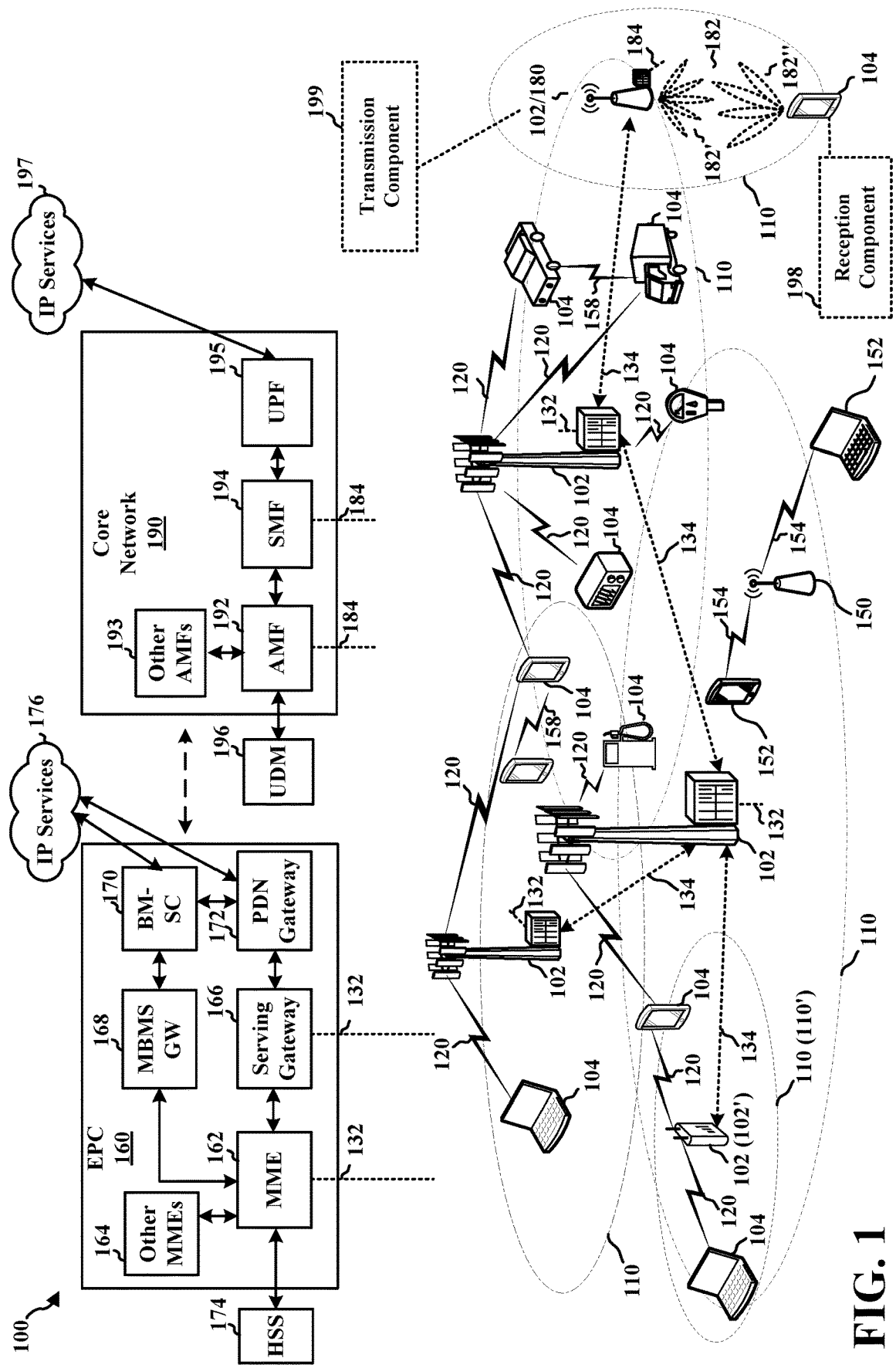
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to determine a CCA threshold corresponding to at least one bandwidth associated with the COT sharing procedure. Reception component 198 may also be configured to adjust the CCA threshold corresponding to the at least one bandwidth based on at least one of one or more sensing bandwidths or one or more granted resources for the COT sharing procedure. Reception component 198 may also be configured to calculate a difference between a UE sensing bandwidth of the one or more sensing bandwidths and a base station sensing bandwidth of the one or more sensing bandwidths. Reception component 198 may also be configured to adjust the at least one bandwidth based on the calculated difference between the UE sensing bandwidth and the base station sensing bandwidth. Reception component 198 may also be configured to signal the adjusted CCA threshold to the at least one of a node or the BS.

Referring again to FIG. 1, in certain aspects, the base station 180 may include a transmission component 199 configured to determine a CCA threshold corresponding to at least one bandwidth, the at least one bandwidth being associated with a COT sharing procedure. Transmission component 199 may also be configured to adjust the CCA threshold corresponding to the at least one bandwidth based on at least one of one or more sensing bandwidths or one or more granted resources for the COT sharing procedure. Transmission component 199 may also be configured to calculate a difference between a UE sensing bandwidth of the one or more sensing bandwidths and a base station sensing bandwidth of the one or more sensing bandwidths. Transmission component 199 may also be configured to adjust the at least one bandwidth based on the calculated difference between the UE sensing bandwidth and the base station sensing bandwidth. Transmission component 199 may also be configured to signal the adjusted CCA threshold corresponding to the at least one bandwidth to at least one of a node or a UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
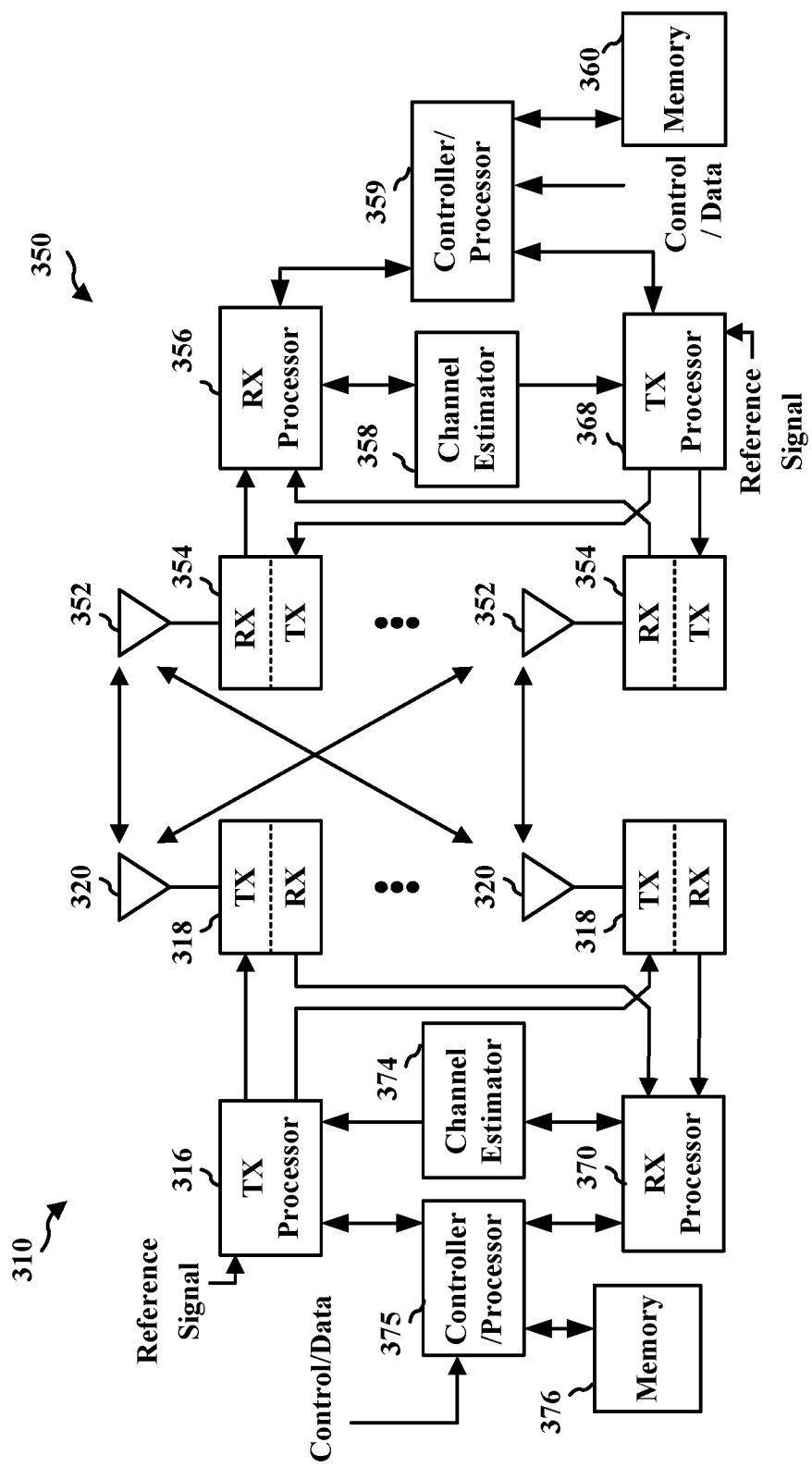
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications include node operating channel heterogeneity, such as heterogeneous radio frequency (RF) bandwidths in an unlicensed spectrum.

For instance, an unlicensed spectrum, e.g., around 60 GHz, may permit a deployment of nodes with a wide variety of bandwidths. Aggressor nodes with bandwidth heterogeneity may cause a frequency selective interference. Further, victim nodes with bandwidth heterogeneity may suffer a frequency selective interference. Wireless communications may also include serving cell bandwidth heterogeneity. For instance, in new radio (NR) wireless communications, a base station and served UEs may use different bandwidths or bandwidth parts (BWPs) for operation on a single network operating channel. In some instances, there may be no common channelization. Also, non-NR victims and aggressors may use wider bands, e.g., 2.16 GHz.

Aspects of wireless communications may include bandwidth and sensing thresholds. For example, European telecommunications standards institute (ETSI) models for adaptivity may be around 60 GHz. An energy threshold $X_T(P_{out})$ may be a function of a maximum equivalent isotropic radiated power (EIRP) $P_{out}$, e.g., for $P_{out}$ in dBm. Also, the following formula may be utilized for the threshold: $X_T(P_{out})=-47$ dBm$+(40$ dBm$-P_{out})$. This may also be independent of a bandwidth of the operating channel. Further, ETSI adaptivity for load-based equipment may be another frequency, e.g., at 5 GHz, assuming a transmission bandwidth B and EIRP $P_{out}$ in dBm. The following formula may also be utilized for the threshold: $X_T(P_{out})=-73$ dBm$+10*\log10(B)+(23$ dBm$-P_{out})$. The threshold may also increase with a bandwidth contended for fixed EIRP $P_{out}$. In NR-unlicensed (NR-U) in certain frequencies, e.g., 5 GHz, an NR-unlicensed sensing may be assumed to be performed in a channel of 20 MHz bandwidth in listen-before-talk (LBT) communication. This may occur at an energy detection (ED) threshold for transmitting at maximum power (max P). In some instances, there may be a fixed high threshold per 20 MHz in absence of other technologies, e.g., −52 dBm. Otherwise, the threshold may be determined as a function of channel bandwidth, e.g., an LBT bandwidth of 20 MHz, and an output power relationship.

Aspects of wireless communication may also include a contention slot busy determination by sensing. In LBT communications, a carrier sense unit at a contending node in an unlicensed band operation may determine whether a contention slot, e.g., 9 μs for sub-6 GHz or 5 μs for 60 GHz, is busy for a node. For instance, the carrier sense unit may determine if a sensed interference level quality metric, e.g., energy received, is a greater than a threshold. The energy may be measured over the bandwidth of an operating channel for sensing. The threshold may be a function of a power class, maximum transmit power, or EIRP.

Figure 4:
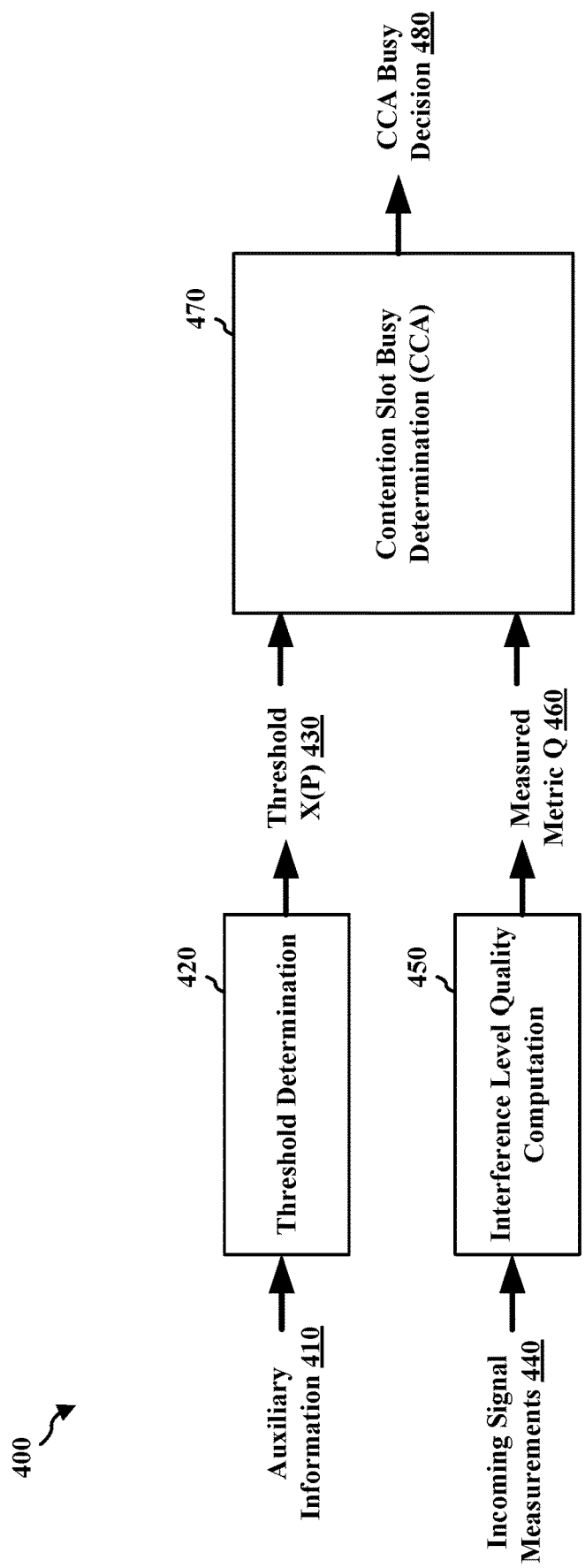
FIG. 4 is a diagram illustrating an example contention determination process in accordance with one or more techniques of the present disclosure.

FIG. 4 is a diagram 400 illustrating an example contention determination process. As shown in FIG. 4, diagram 400 includes auxiliary information 410, a threshold determination 420, a threshold 430, incoming signal measurements 440, an interference level quality computation 450, and a measured metric Q 460. Diagram 400 also includes a contention slot busy determination or clear channel assessment (CCA) 470 and a CCA busy decision 480.

As shown in FIG. 4, auxiliary information 410, e.g., bandwidth, power class, or transmit power, may be an input for a threshold determination 420. The threshold determination 420 may produce a threshold 430, i.e., X(P) 430. Also, an incoming signal measurement 440 may be an input to an interference level quality computation 450, e.g., an energy measurement, which may produce a measured metric Q 460, e.g., energy. The threshold X(P) 430 and the measured metric Q 460 may be utilized in a contention slot busy decision 470, e.g., a clear channel assessment (CCA) 470. This contention slot busy decision or CCA 470 may result in CCA busy decision 480. For example, CCA busy decision 480 may be a true or false answer depending on whether measured metric Q 460 is greater than or equal to threshold X(P) 430.

Additionally, there may be a schematic relationship between a heterogeneous operating channel, a sensing bandwidth, and a transmission bandwidth. A sensing bandwidth may be a bandwidth over which energy is measured to make a determination about channel access in an unlicensed or shared spectrum. For example, the smallest sensing bandwidth for Wi-Fi may be 20 MHz. For NR-U, the sensing bandwidth at a UE and a base station may be a multiple of an LBT bandwidth, e.g., 20 MHz.

Figure 5:
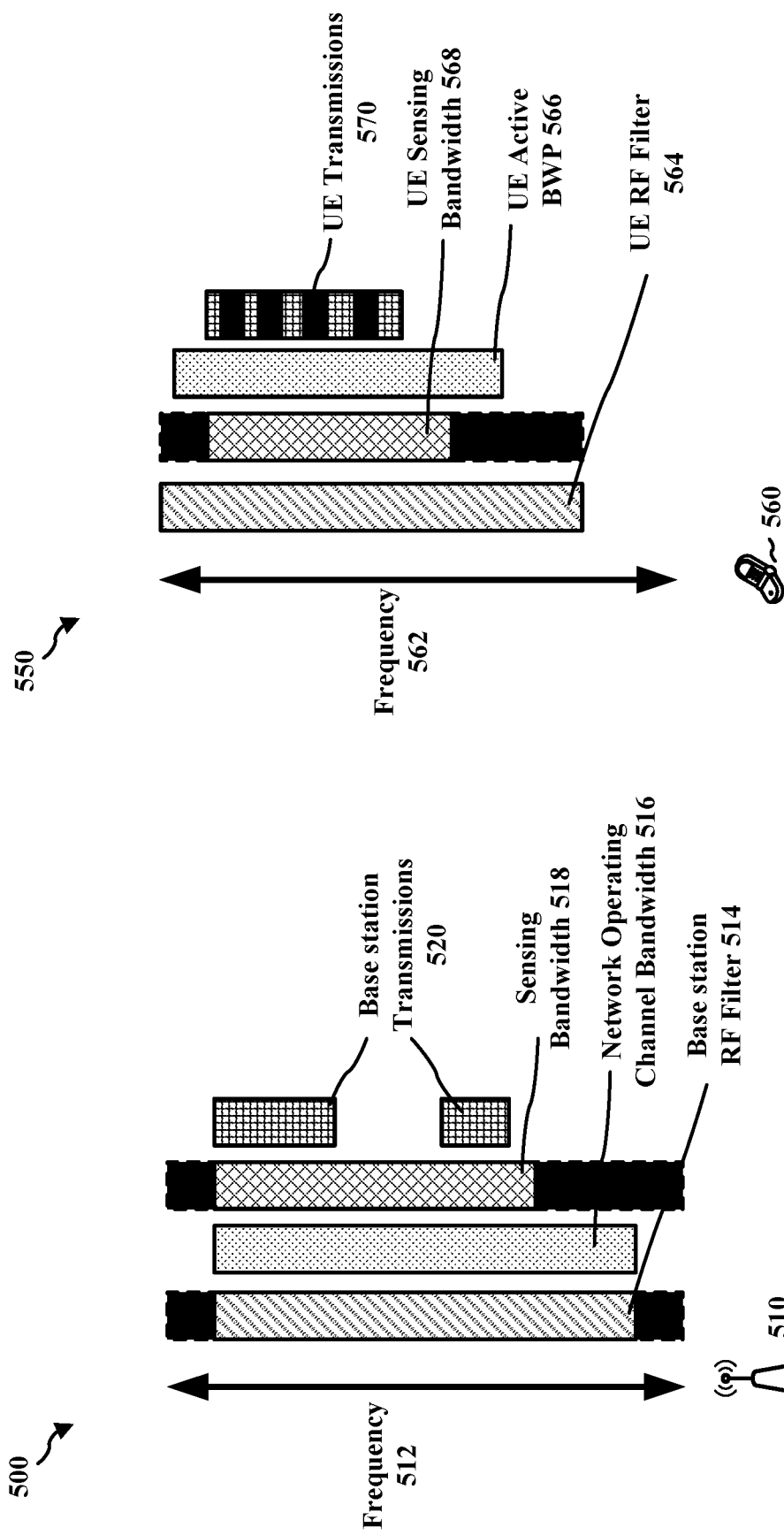
FIG. 5A is a diagram illustrating example transmissions of a base station in accordance with one or more techniques of the present disclosure.
FIG. 5B is a diagram illustrating example transmissions of a UE in accordance with one or more techniques of the present disclosure.

FIG. 5A is a diagram 500 illustrating transmissions of a base station 510. FIG. 5A displays a number of transmission bandwidths and communications at base station 510. As shown in FIG. 5A, diagram 500 includes base station 510, frequency 512, base station radio frequency (RF) filter 514, network operating channel bandwidth 516, sensing bandwidth 518, and base station transmissions 520. FIG. 5A shows that the base station transmissions 520 may be within the sensing bandwidth 518.

FIG. 5B is a diagram 550 illustrating transmissions of a UE 560. FIG. 5B displays a number of transmission bandwidths and communications at UE 560. As shown in FIG. 5B, diagram 550 includes a frequency 562, a UE RF filter 564, a UE active BWP 566, UE sensing bandwidth 568, and UE transmissions 570. FIG. 5B shows that the UE transmissions 570 may be within the UE sensing bandwidth 568.

As described above, during the operations of NR in an unlicensed spectrum, a BS may acquire a medium by performing a CAT4 LBT procedure, such as an extended CCA (eCCA), prior to communicating in order to determine whether the shared channel is available. The BS may reserve the medium for a period of time, which may be referred to as a COT. The BS may transmit downlink (DL) traffic to the user equipment (UE) during the COT. In some instances, the COT may be shared with the UE so that the UE may also transmit uplink (UL) traffic to the BS during the BS's COT. Prior to each UL transmission during the BS's COT, the UE may perform a category 2 (CAT2) LBT. However, in some instances, the UL transmission (e.g., UL control traffic) may use a smaller bandwidth than the DL transmission. As such, it may be beneficial to adjust the CCA threshold and signal the adjustment to the UE or the BS. Also, a COT sharing procedure may be initiated with one or more granted resources.

Aspects of the present disclosure may include a threshold adjustment based on at least one of one or more sensing bandwidths or one or more granted resources for the COT sharing procedure. For example, aspects of the present disclosure may include a threshold adjustment based on a ratio of a reference bandwidth and a transmission bandwidth. In another example, aspects of the present disclosure may include a threshold adjustment based on a ratio of a base station sensing bandwidth and a UE sensing bandwidth. Aspects of the present disclosure may also include a threshold adjustment based on at least one of a transmit power, a transmit equivalent isotropic radiated power (EIRP), and a transmit power spectral density (PSD). Aspects of the present disclosure may then signal the adjusted threshold.

Aspects of the present disclosure may define a reference bandwidth, $B_0$, or a reference threshold, $X_0(B_0, P_T)$, expressed in dBm. As indicated above, the sensing bandwidth may be larger than an operating bandwidth or a transmission bandwidth. The reference bandwidth may be used as a reference to determine whether a transmission medium is available for transmission. In some aspects, the reference bandwidth may be a part of a quantized set of reference bandwidths that are used to compute an energy threshold. Also, $P_T$ may represent a static or semi-static version of transmit power. For example, $P_T$ may represent a maximum EIRP permitted for a device class or a transmit power class.

Figure 6:
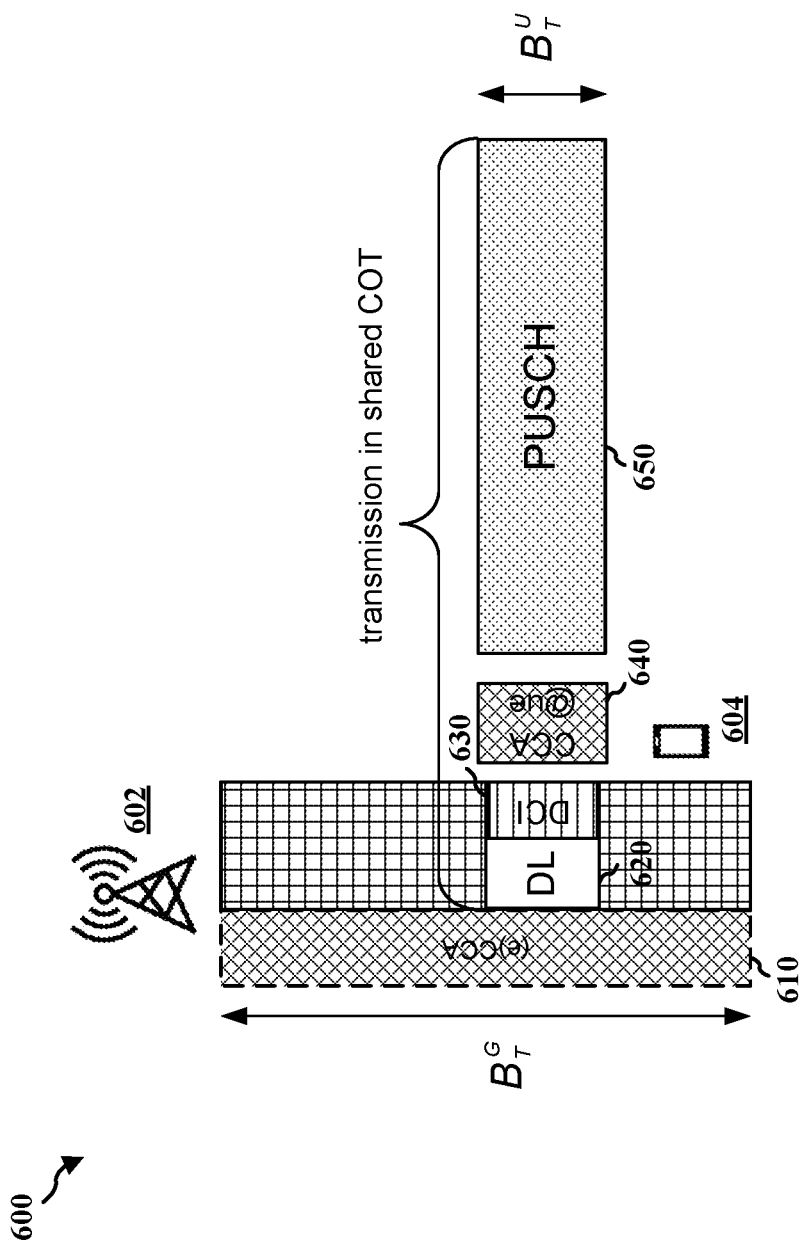
FIG. 6 is a diagram illustrating an example DL to UL COT sharing from the BS to the UE in accordance with one or more techniques of the present disclosure.

FIG. 6 is a diagram 600 illustrating an example DL to UL COT sharing from a BS 602 to a UE 604. Regarding the DL to UL COT sharing, there may be three scenarios: (1) the sensing bandwidth of the BS ($B_s^g$) is equal to the sensing bandwidth of the UE ($B_s^u$); (2) the sensing bandwidth of the BS is greater than the sensing bandwidth of the UE; and (3) the sensing bandwidth of the BS is less than the sensing bandwidth of the UE. For scenario (1), aspects of the present disclosure may follow rules of 5G NR in an unlicensed spectrum (NR-U) and may use a default threshold. For scenario (3), aspects of the present disclosure may either disallow DL to UL COT sharing or allow under the worst case assumptions. That is, the threshold may be decreased or kept constant.

For scenario (2) shown in FIG. 6, the diagram 600 shows the case where the transmission bandwidth ($B_t^g$) (and the sensing bandwidth ($B_s^g$)) of the BS 602 is greater than the transmission bandwidth ($B_t^u$) (and the sensing bandwidth ($B_s^u$)) of the UE 604. As shown in FIG. 6, the BS 602 may acquire the COT in the medium using an extended CCA 610, transmit DL traffic 620 to the UE 604 during the COT, and share the COT with the UE so that the UE 604 may also transmit UL traffic to the BS during the BS's COT. The UE may share the BS's COT using a single slot CCA 640.

In this case, the CCA threshold may be adjusted for the UE's medium sensing prior to the UL transmission in the shared COT. For example, the CCA threshold may be adjusted corresponding to at least one bandwidth based on sensing bandwidths or granted resources for the COT sharing procedure. In one aspect, the CCA threshold may be adjusted based on a ratio of a reference bandwidth and a transmission bandwidth. For example, $$X^u = X_0(B_0, P_T) + 10 * \log_{10}\left(\frac{B_o}{B_T}\right),$$

where $X^u$ is the adjusted CCA threshold, $X_0(B_0, P_T)$ is the reference threshold, $B_0$ is the reference bandwidth, and $B_T$ is the transmission bandwidth. In another aspect, the CCA threshold may be adjusted based on a ratio of the BS sensing bandwidth and the UE sensing bandwidth. For example, $$X^u = X_0(B_0, P_T) + 10 * \log_{10}\left(\frac{B_s^g}{B_s^u}\right),$$

where $X^u$ is the adjusted CCA threshold, $X_0(B_0, P_T)$ is the reference threshold, $B_s^g$ is the BS sensing bandwidth, and $B_s^u$ is the UE sensing bandwidth. Once the CCA threshold has been adjusted, the CCA threshold may be explicitly signaled using downlink control information (DCI) 630. The UE 604 may use the received CCA threshold, for example, to upload using the physical uplink shared channel (PUSCH) 650. In other aspects, the adjusted CCA threshold may be implicitly signed via sensing thresholds or sensing bandwidths.

Figure 7:
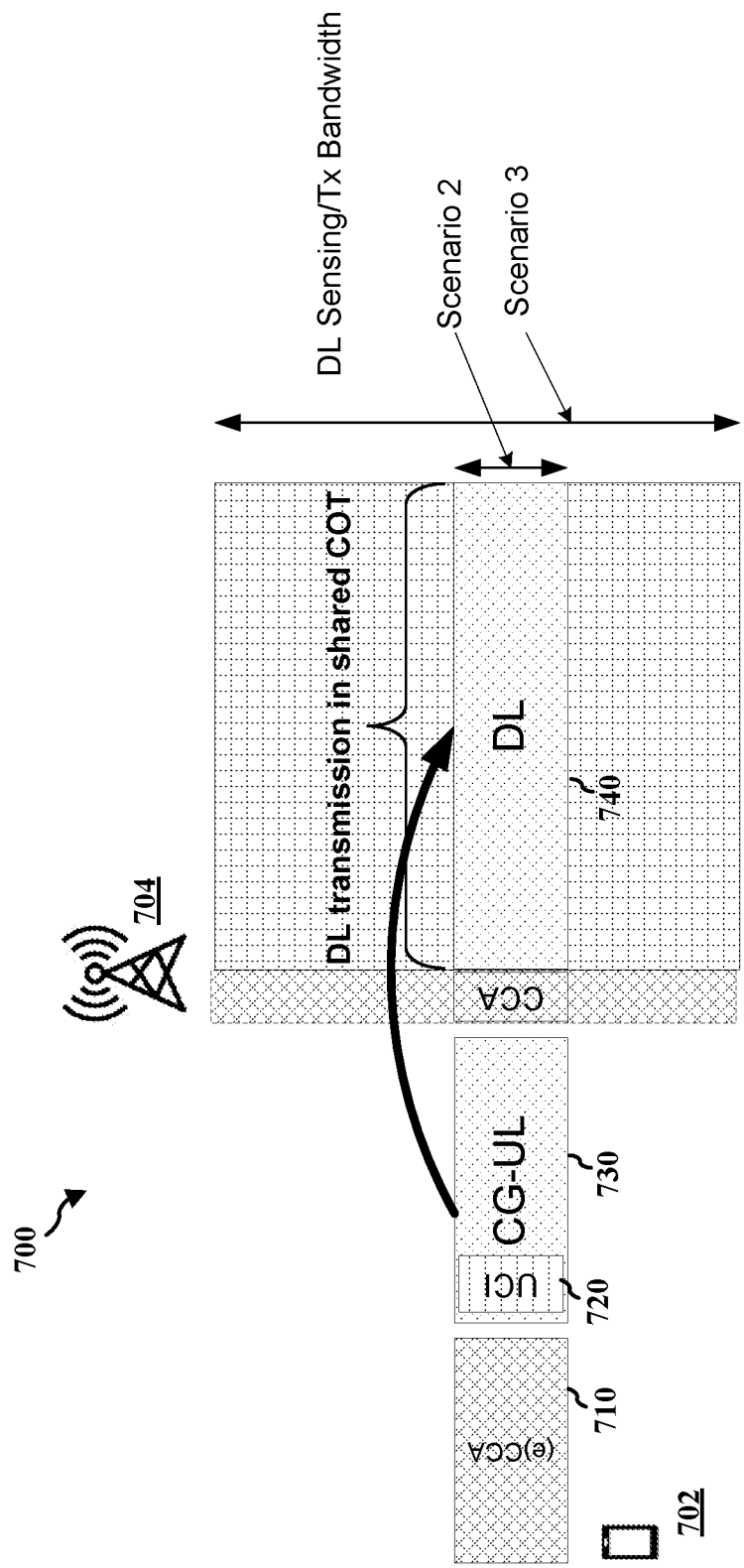
FIG. 7 is a diagram illustrating an example UL to DL COT sharing from the UE to the BS in accordance with one or more techniques of the present disclosure.

FIG. 7 is a diagram 700 illustrating an example UL to DL COT sharing from the UE 702 to the BS 704. As shown in FIG. 7, the UE may perform an extended CCA 710 to acquire the COT in the medium; adjust the CCA threshold and explicitly signal the adjusted threshold via uplink control information (UCI) 720. In this case, the uplink may be performed with a configured grant 730 for the COT sharing procedure.

As shown in FIG. 7, the UL to DL COT sharing may also have three scenarios: (1) the sensing bandwidth of the BS (Be) may be equal to the sensing bandwidth of the UE ($B_s^u$); (2) the sensing bandwidth of the BS may be less than the sensing bandwidth of the UE; and (3) the sensing bandwidth of the BS may be greater than the sensing bandwidth of the UE. For scenario (1), aspects of the present disclosure may follow rules of 5G NR in an unlicensed spectrum (NR-U) and may use a default threshold. For scenario (2) shown in FIG. 7, the UE 702 may signal a subset of the sensing bandwidth, sensing threshold, and sensing threshold adjustment. For scenario (3) shown in FIG. 7, the diagram 700 shows the case where the DL transmission 740 may be restricted to the sensing bandwidth used for UL channel access.

Figure 8:
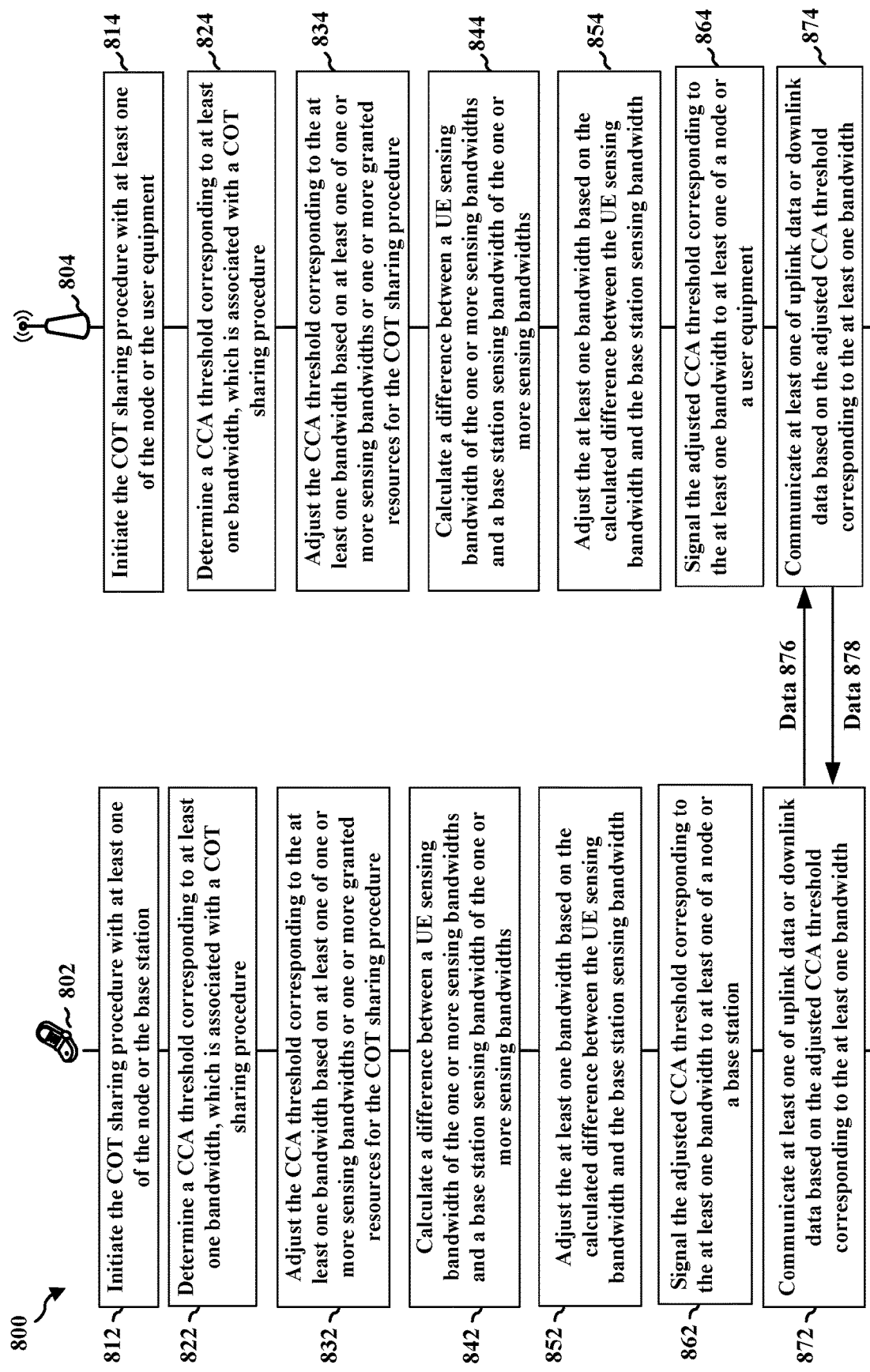
FIG. 8 is a diagram illustrating example communication between a UE and a BS in accordance with one or more techniques of the present disclosure.

FIG. 8 is a diagram 800 illustrating example communication between a UE 802 and a base station 804.

At 812, UE 802 may initiate a channel occupancy time (COT) sharing procedure with at least one of a node or a base station. At 814, base station 804 may initiate a COT sharing procedure with at least one of a node or a UE. A COT sharing procedure may refer to a channel occupancy being shared from an initiating/contending node (e.g., a base station or UE) to a sharing node (e.g., a UE or base station). For instance, in a COT sharing procedure, an initiating node (e.g., a base station or UE) may reserve a channel or medium for a period of time, which may be referred to as a COT. The initiating node (e.g., a base station or UE) may then transmit DL/UL traffic to a sharing node (e.g., a UE or base station) during the COT. Also, the COT may be shared with the sharing node (e.g., a UE or base station) so that the sharing node may transmit UL/DL traffic to the initiating node (e.g., a base station or UE) during the initiating node's COT.

At 822, UE 802 may determine a CCA threshold corresponding to at least one bandwidth, the at least one bandwidth being associated with a COT sharing procedure. At 824, base station 804 may determine a CCA threshold corresponding to at least one bandwidth, the at least one bandwidth being associated with a COT sharing procedure.

At 832, UE 802 may adjust the CCA threshold corresponding to the at least one bandwidth based on at least one of one or more sensing bandwidths or one or more granted resources for the COT sharing procedure. At 834, base station 804 adjust the CCA threshold corresponding to the at least one bandwidth based on at least one of one or more sensing bandwidths or one or more granted resources for the COT sharing procedure.

In some aspects, the CCA threshold may be adjusted based on a ratio of a reference bandwidth and a transmission bandwidth. Also, the CCA threshold may be adjusted based on a ratio of a base station sensing bandwidth and a UE sensing bandwidth. The CCA threshold may be adjusted based on at least one of a transmit power, a transmit equivalent isotropic radiated power (EIRP), or a transmit power spectral density (PSD). In some aspects, the adjusted CCA threshold may be explicitly signaled via uplink control information (UCI) or downlink control information (DCI).

Also, the adjusted CCA threshold may be implicitly signaled via at least one of one or more sensing thresholds or the one or more sensing bandwidths.

In some aspects, the one or more granted resources for the COT sharing procedure may correspond to at least one of uplink resources or downlink resources. In some aspects, the at least one bandwidth may include at least one of a reference bandwidth, a static bandwidth, or a transmission bandwidth. In some aspects, the one or more granted resources may be configured for the COT sharing procedure. In some aspects, adjusting the CCA threshold may include increasing the CCA threshold or decreasing the CCA threshold. In some aspects, the UE may be an initiator node (i.e., initiating node) or a sharing node in the COT sharing procedure.

At 842, UE 802 may calculate a difference between a UE sensing bandwidth of the one or more sensing bandwidths and a base station sensing bandwidth of the one or more sensing bandwidths. At 844, base station 804 may calculate a difference between a UE sensing bandwidth of the one or more sensing bandwidths and a base station sensing bandwidth of the one or more sensing bandwidths.

At 852, UE 802 may adjust the at least one bandwidth based on the calculated difference between the UE sensing bandwidth and the base station sensing bandwidth. At 854, base station 804 may adjust the at least one bandwidth based on the calculated difference between the UE sensing bandwidth and the base station sensing bandwidth. In some aspects, the difference between the UE sensing bandwidth and the base station sensing bandwidth includes a difference between at least one of a transmit power, a transmit equivalent isotropic radiated power (EIRP), or a transmit power spectral density (PSD).

At 862, UE 802 may signal the adjusted CCA threshold corresponding to the at least one bandwidth via the transmission medium to at least one of a node or a base station. At 864, base station 804 may signal the adjusted CCA threshold corresponding to the at least one bandwidth via the transmission medium to at least one of a node or a user equipment.

At 872, UE 802 may communicate at least one of uplink data or downlink data, e.g., data 876, based on the adjusted CCA threshold corresponding to the at least one bandwidth. At 874, base station 804 may communicate at least one of uplink data or downlink data, e.g., data 878, based on the adjusted CCA threshold corresponding to the at least one bandwidth. Base station 804 may also configure one or more granted resources for a COT sharing procedure.

Figure 9:
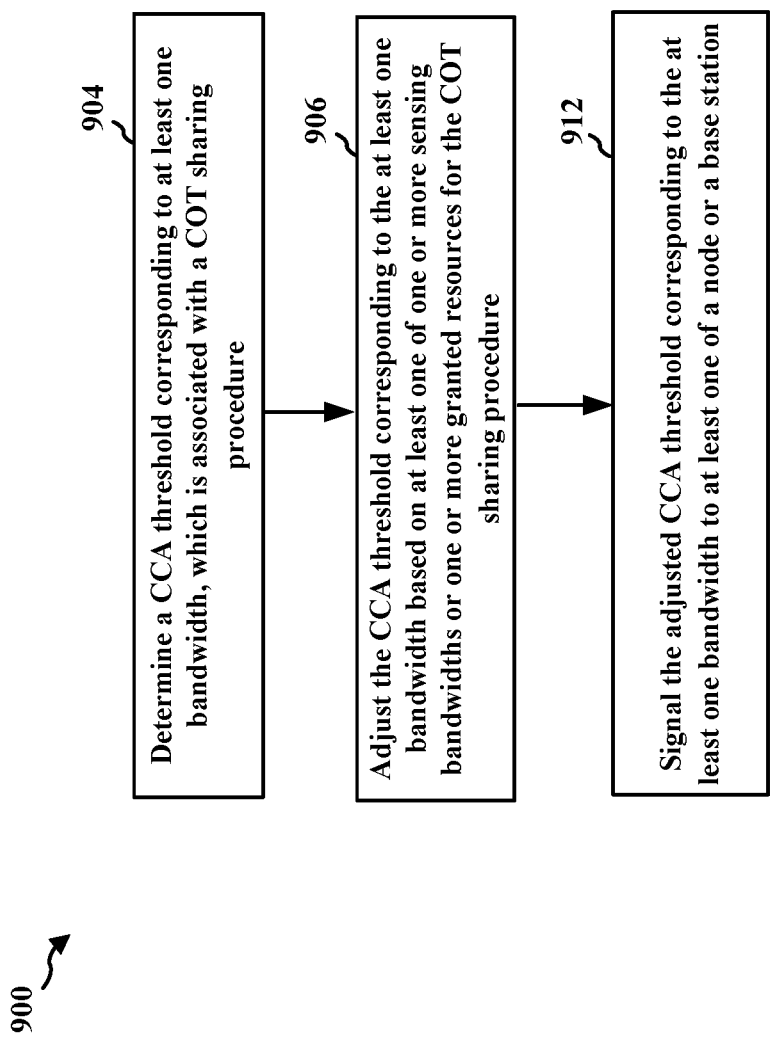
FIG. 9 is a flowchart of a method of wireless communication.

FIG. 9 is a flowchart 900 of a method of wireless communication. The method may be performed by a UE or a component of a UE (e.g., the UE 104, 350, 802; the apparatus 1302; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 904, the apparatus may determine a CCA threshold corresponding to at least one bandwidth, the at least one bandwidth being associated with a COT sharing procedure, as described in connection with the examples in FIGS. 4, 5A, 5B, 6, 7, and 8. For example, UE 802 may determine a CCA threshold corresponding to at least one bandwidth, the at least one bandwidth being associated with a COT sharing procedure, as described in connection with 822 in FIG. 8. Further, 904 may be performed by determination component 1340 in FIG. 13.

At 906, the apparatus may adjust the CCA threshold corresponding to the at least one bandwidth based on at least one of one or more sensing bandwidths or one or more granted resources for the COT sharing procedure, as described in connection with the examples in FIGS. 4, 5A, 5B, 6, 7, and 8. For example, UE 802 may adjust the CCA threshold corresponding to the at least one bandwidth based on at least one of one or more sensing bandwidths or one or more granted resources for the COT sharing procedure, as described in connection with 832 in FIG. 8. Further, 906 may be performed by determination component 1340 in FIG. 13.

In some aspects, the CCA threshold may be adjusted based on a ratio of a reference bandwidth and a transmission bandwidth. Also, the CCA threshold may be adjusted based on a ratio of a base station sensing bandwidth and a UE sensing bandwidth. The CCA threshold may be adjusted based on at least one of a transmit power, a transmit equivalent isotropic radiated power (EIRP), or a transmit power spectral density (PSD). In some aspects, the adjusted CCA threshold may be explicitly signaled via uplink control information (UCI) or downlink control information (DCI). Also, the adjusted CCA threshold may be implicitly signaled via at least one of one or more sensing thresholds or the one or more sensing bandwidths.

In some aspects, the one or more granted resources for the COT sharing procedure may correspond to at least one of uplink resources or downlink resources. In some aspects, the at least one bandwidth may include at least one of a reference bandwidth, a static bandwidth, or a transmission bandwidth. In some aspects, the one or more granted resources may be configured for the COT sharing procedure. In some aspects, adjusting the CCA threshold may include increasing the CCA threshold or decreasing the CCA threshold. In some aspects, the UE may be an initiator node or a sharing node in the COT sharing procedure.

At 912, the apparatus may signal the adjusted CCA threshold corresponding to the at least one bandwidth via the transmission medium to at least one of a node or a base station, as described in connection with the examples in FIGS. 4, 5A, 5B, 6, 7, and 8. For example, UE 802 may signal the adjusted CCA threshold corresponding to the at least one bandwidth via the transmission medium to at least one of a node or a base station, as described in connection with 862 in FIG. 8. Further, 912 may be performed by determination component 1340 in FIG. 13.

Figure 10:
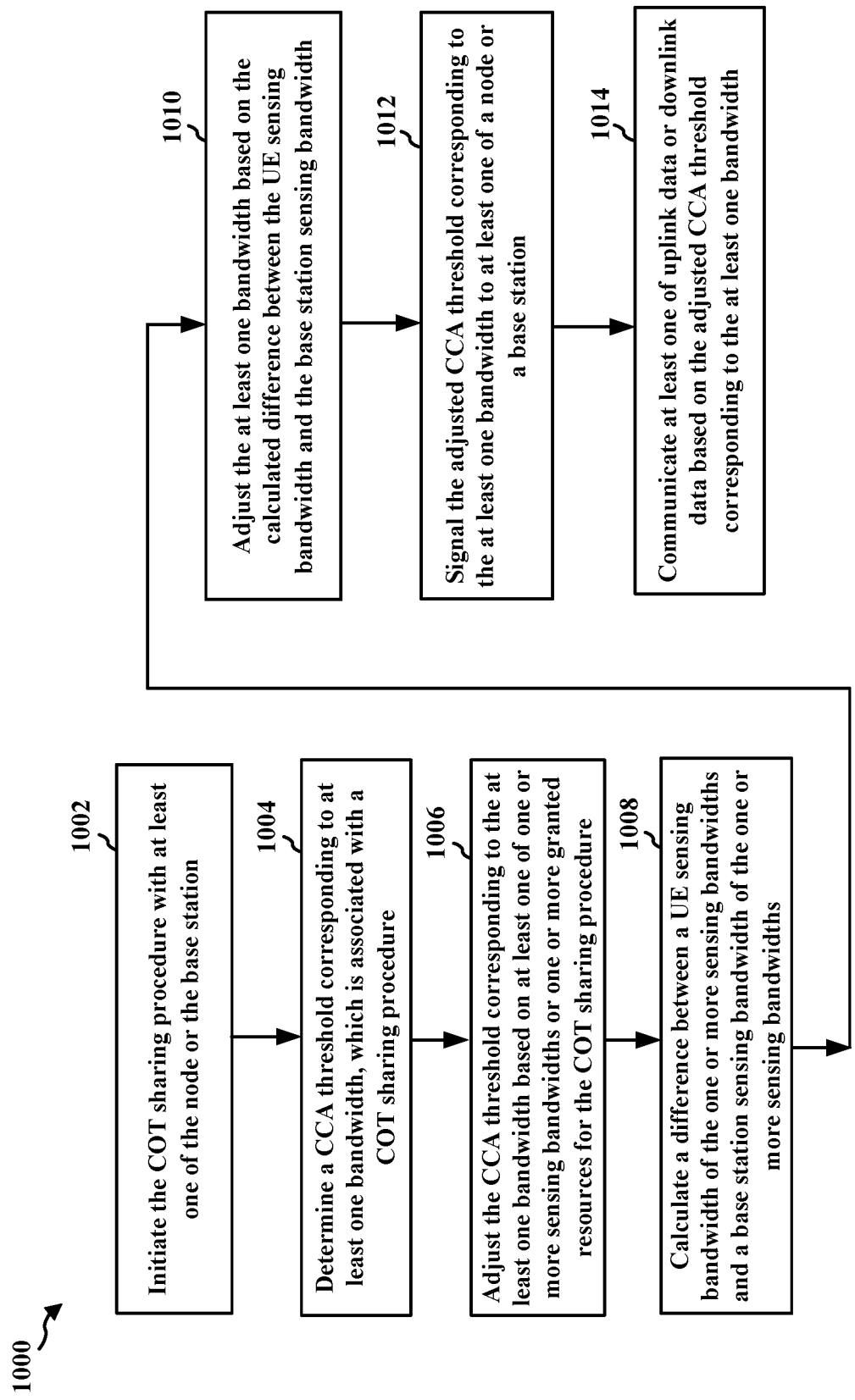
FIG. 10 is a flowchart of a method of wireless communication.

FIG. 10 is a flowchart 1000 of a method of wireless communication. The method may be performed by a UE or a component of a UE (e.g., the UE 104, 350, 802; the apparatus 1302; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1002, the apparatus may initiate the COT sharing procedure with at least one of the node or the base station, as described in connection with the examples in FIGS. 4, 5A, 5B, 6, 7, and 8. For example, UE 802 may initiate the COT sharing procedure with at least one of the node or the base station, as described in connection with 812 in FIG. 8. Further, 1002 may be performed by determination component 1340 in FIG. 13.

At 1004, the apparatus may determine a CCA threshold corresponding to at least one bandwidth, the at least one bandwidth being associated with a COT sharing procedure, as described in connection with the examples in FIGS. 4, 5A, 5B, 6, 7, and 8. For example, UE 802 may determine a CCA threshold corresponding to at least one bandwidth, the at least one bandwidth being associated with a COT sharing procedure, as described in connection with 822 in FIG. 8. Further, 1004 may be performed by determination component 1340 in FIG. 13.

At 1006, the apparatus may adjust the CCA threshold corresponding to the at least one bandwidth based on at least one of one or more sensing bandwidths or one or more granted resources for the COT sharing procedure, as described in connection with the examples in FIGS. 4, 5A, 5B, 6, 7, and 8. For example, UE 802 may adjust the CCA threshold corresponding to the at least one bandwidth based on at least one of one or more sensing bandwidths or one or more granted resources for the COT sharing procedure, as described in connection with 832 in FIG. 8. Further, 1006 may be performed by determination component 1340 in FIG. 13.

In some aspects, the CCA threshold may be adjusted based on a ratio of a reference bandwidth and a transmission bandwidth. Also, the CCA threshold may be adjusted based on a ratio of a base station sensing bandwidth and a UE sensing bandwidth. The CCA threshold may be adjusted based on at least one of a transmit power, a transmit equivalent isotropic radiated power (EIRP), or a transmit power spectral density (PSD). In some aspects, the adjusted CCA threshold may be explicitly signaled via uplink control information (UCI) or downlink control information (DCI). Also, the adjusted CCA threshold may be implicitly signaled via at least one of one or more sensing thresholds or the one or more sensing bandwidths.

In some aspects, the one or more granted resources for the COT sharing procedure may correspond to at least one of uplink resources or downlink resources. In some aspects, the at least one bandwidth may include at least one of a reference bandwidth, a static bandwidth, or a transmission bandwidth. In some aspects, the one or more granted resources may be configured for the COT sharing procedure. In some aspects, adjusting the CCA threshold may include increasing the CCA threshold or decreasing the CCA threshold. In some aspects, the UE may be an initiator node or a sharing node in the COT sharing procedure.

At 1008, the apparatus may calculate a difference between a UE sensing bandwidth of the one or more sensing bandwidths and a base station sensing bandwidth of the one or more sensing bandwidths, as described in connection with the examples in FIGS. 4, 5A, 5B, 6, 7, and 8. For example, UE 802 may calculate a difference between a UE sensing bandwidth of the one or more sensing bandwidths and a base station sensing bandwidth of the one or more sensing bandwidths, as described in connection with 842 in FIG. 8. Further, 1008 may be performed by determination component 1340 in FIG. 13.

At 1010, the apparatus may adjust the at least one bandwidth based on the calculated difference between the UE sensing bandwidth and the base station sensing bandwidth, as described in connection with the examples in FIGS. 4, 5A, 5B, 6, 7, and 8. For example, UE 802 may adjust the at least one bandwidth based on the calculated difference between the UE sensing bandwidth and the base station sensing bandwidth, as described in connection with 852 in FIG. 8. Further, 1010 may be performed by determination component 1340 in FIG. 13. In some aspects, the difference between the UE sensing bandwidth and the base station sensing bandwidth includes a difference between at least one of a transmit power, a transmit equivalent isotropic radiated power (EIRP), or a transmit power spectral density (PSD).

At 1012, the apparatus may signal the adjusted CCA threshold corresponding to the at least one bandwidth via the transmission medium to at least one of a node or a base station, as described in connection with the examples in FIGS. 4, 5A, 5B, 6, 7, and 8. For example, UE 802 may signal the adjusted CCA threshold corresponding to the at least one bandwidth via the transmission medium to at least one of a node or a base station, as described in connection with 862 in FIG. 8. Further, 1012 may be performed by determination component 1340 in FIG. 13.

At 1014, the apparatus may communicate at least one of uplink data or downlink data based on the adjusted CCA threshold corresponding to the at least one bandwidth, as described in connection with the examples in FIGS. 4, 5A, 5B, 6, 7, and 8. For example, UE 802 may communicate at least one of uplink data or downlink data based on the adjusted CCA threshold corresponding to the at least one bandwidth, as described in connection with 872 in FIG. 8. Further, 1014 may be performed by determination component 1340 in FIG. 13.

Figure 11:
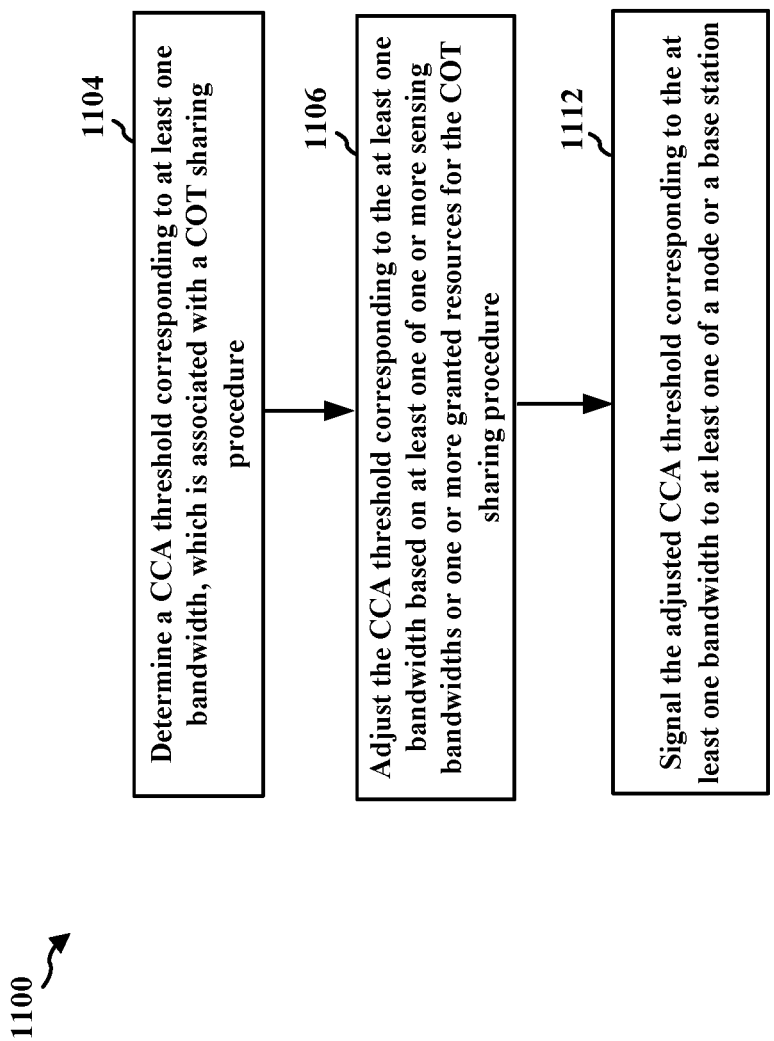
FIG. 11 is a flowchart of a method of wireless communication.

FIG. 11 is a flowchart 1100 of a method of wireless communication. The method may be performed by a base station or a component of a base station (e.g., the base station 102, 180, 310, 804; the apparatus 1402; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1104, the apparatus may determine a CCA threshold corresponding to at least one bandwidth, the at least one bandwidth being associated with a COT sharing procedure, as described in connection with the examples in FIGS. 4, 5A, 5B, 6, 7, and 8. For example, base station 804 may determine a CCA threshold corresponding to at least one bandwidth, the at least one bandwidth being associated with a COT sharing procedure, as described in connection with 824 in FIG. 8. Further, 1104 may be performed by determination component 1440 in FIG. 14.

At 1106, the apparatus may adjust the CCA threshold corresponding to the at least one bandwidth based on at least one of one or more sensing bandwidths or one or more granted resources for the COT sharing procedure, as described in connection with the examples in FIGS. 4, 5A, 5B, 6, 7, and 8. For example, base station 804 may adjust the CCA threshold corresponding to the at least one bandwidth based on at least one of one or more sensing bandwidths or one or more granted resources for the COT sharing procedure, as described in connection with 834 in FIG. 8. Further, 1106 may be performed by determination component 1440 in FIG. 14.

In some aspects, the CCA threshold may be adjusted based on a ratio of a reference bandwidth and a transmission bandwidth. Also, the CCA threshold may be adjusted based on a ratio of a base station sensing bandwidth and a UE sensing bandwidth. The CCA threshold may be adjusted based on at least one of a transmit power, a transmit equivalent isotropic radiated power (EIRP), or a transmit power spectral density (PSD). In some aspects, the adjusted CCA threshold may be explicitly signaled via uplink control information (UCI) or downlink control information (DCI). Also, the adjusted CCA threshold may be implicitly signaled via at least one of one or more sensing thresholds or the one or more sensing bandwidths.

In some aspects, the one or more granted resources for the COT sharing procedure may correspond to at least one of uplink resources or downlink resources. In some aspects, the at least one bandwidth may include at least one of a reference bandwidth, a static bandwidth, or a transmission bandwidth. In some aspects, the one or more granted resources may be configured for the COT sharing procedure. In some aspects, adjusting the CCA threshold may include increasing the CCA threshold or decreasing the CCA threshold. In some aspects, the UE may be an initiator node or a sharing node in the COT sharing procedure.

At 1112, the apparatus may signal the adjusted CCA threshold corresponding to the at least one bandwidth via the transmission medium to at least one of a node or a base station, as described in connection with the examples in FIGS. 4, 5A, 5B, 6, 7, and 8. For example, base station 804 may signal the adjusted CCA threshold corresponding to the at least one bandwidth via the transmission medium to at least one of a node or a base station, as described in connection with 864 in FIG. 8. Further, 1112 may be performed by determination component 1440 in FIG. 14.

Figure 12:
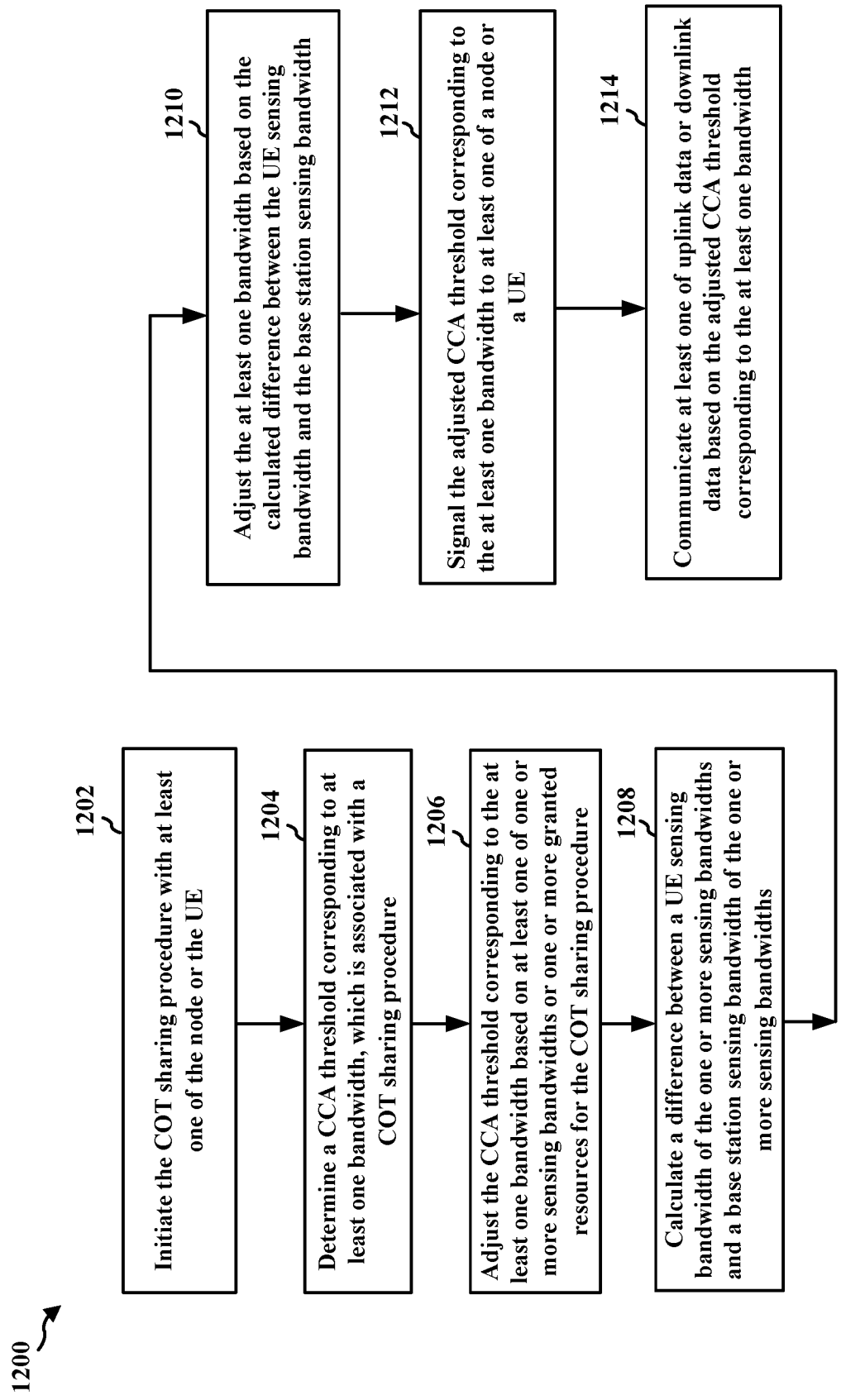
FIG. 12 is a flowchart of a method of wireless communication.

FIG. 12 is a flowchart 1200 of a method of wireless communication. The method may be performed by a base station or a component of a base station (e.g., the base station 102, 180, 310, 804; the apparatus 1402; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1202, the apparatus may initiate the COT sharing procedure with at least one of the node or the user equipment, as described in connection with the examples in FIGS. 4, 5A, 5B, 6, 7, and 8. For example, base station 804 may initiate the COT sharing procedure with at least one of the node or the user equipment, as described in connection with 814 in FIG. 8. Further, 1202 may be performed by determination component 1440 in FIG. 14.

At 1204, the apparatus may determine a CCA threshold corresponding to at least one bandwidth, the at least one bandwidth being associated with a COT sharing procedure, as described in connection with the examples in FIGS. 4, 5A, 5B, 6, 7, and 8. For example, base station 804 may determine a CCA threshold corresponding to at least one bandwidth, the at least one bandwidth being associated with a COT sharing procedure, as described in connection with 824 in FIG. 8. Further, 1204 may be performed by determination component 1440 in FIG. 14.

At 1206, the apparatus may adjust the CCA threshold corresponding to the at least one bandwidth based on at least one of one or more sensing bandwidths or one or more granted resources for the COT sharing procedure, as described in connection with the examples in FIGS. 4, 5A, 5B, 6, 7, and 8. For example, base station 804 may adjust the CCA threshold corresponding to the at least one bandwidth based on at least one of one or more sensing bandwidths or one or more granted resources for the COT sharing procedure, as described in connection with 834 in FIG. 8. Further, 1206 may be performed by determination component 1440 in FIG. 14.

In some aspects, the CCA threshold may be adjusted based on a ratio of a reference bandwidth and a transmission bandwidth. Also, the CCA threshold may be adjusted based on a ratio of a base station sensing bandwidth and a UE sensing bandwidth. The CCA threshold may be adjusted based on at least one of a transmit power, a transmit equivalent isotropic radiated power (EIRP), or a transmit power spectral density (PSD). In some aspects, the adjusted CCA threshold may be explicitly signaled via uplink control information (UCI) or downlink control information (DCI). Also, the adjusted CCA threshold may be implicitly signaled via at least one of one or more sensing thresholds or the one or more sensing bandwidths.

In some aspects, the one or more granted resources for the COT sharing procedure may correspond to at least one of uplink resources or downlink resources. In some aspects, the at least one bandwidth may include at least one of a reference bandwidth, a static bandwidth, or a transmission bandwidth. In some aspects, the one or more granted resources may be configured for the COT sharing procedure. In some aspects, adjusting the CCA threshold may include increasing the CCA threshold or decreasing the CCA threshold. In some aspects, the UE may be an initiator node or a sharing node in the COT sharing procedure.

At 1208, the apparatus may calculate a difference between a UE sensing bandwidth of the one or more sensing bandwidths and a base station sensing bandwidth of the one or more sensing bandwidths, as described in connection with the examples in FIGS. 4, 5A, 5B, 6, 7, and 8. For example, base station 804 may calculate a difference between a UE sensing bandwidth of the one or more sensing bandwidths and a base station sensing bandwidth of the one or more sensing bandwidths, as described in connection with 844 in FIG. 8. Further, 1208 may be performed by determination component 1440 in FIG. 14.

At 1210, the apparatus may adjust the at least one bandwidth based on the calculated difference between the UE sensing bandwidth and the base station sensing bandwidth, as described in connection with the examples in FIGS. 4, 5A, 5B, 6, 7, and 8. For example, base station 804 may adjust the at least one bandwidth based on the calculated difference between the UE sensing bandwidth and the base station sensing bandwidth, as described in connection with 854 in FIG. 8. Further, 1210 may be performed by determination component 1440 in FIG. 14. In some aspects, the difference between the UE sensing bandwidth and the base station sensing bandwidth may include a difference between at least one of a transmit power, a transmit equivalent isotropic radiated power (EIRP), or a transmit power spectral density (PSD).

At 1212, the apparatus may signal the adjusted CCA threshold corresponding to the at least one bandwidth via the transmission medium to at least one of a node or a base station, as described in connection with the examples in FIGS. 4, 5A, 5B, 6, 7, and 8. For example, base station 804 may signal the adjusted CCA threshold corresponding to the at least one bandwidth via the transmission medium to at least one of a node or a base station, as described in connection with 864 in FIG. 8. Further, 1212 may be performed by determination component 1440 in FIG. 14.

At 1214, the apparatus may communicate at least one of uplink data or downlink data based on the adjusted CCA threshold corresponding to the at least one bandwidth, as described in connection with the examples in FIGS. 4, 5A, 5B, 6, 7, and 8. For example, base station 804 may communicate at least one of uplink data or downlink data based on the adjusted CCA threshold corresponding to the at least one bandwidth, as described in connection with 874 in FIG. 8. Further, 1214 may be performed by determination component 1440 in FIG. 14. The apparatus, e.g., base station 804, may also configure one or more granted resources for a COT sharing procedure.

Figure 13:
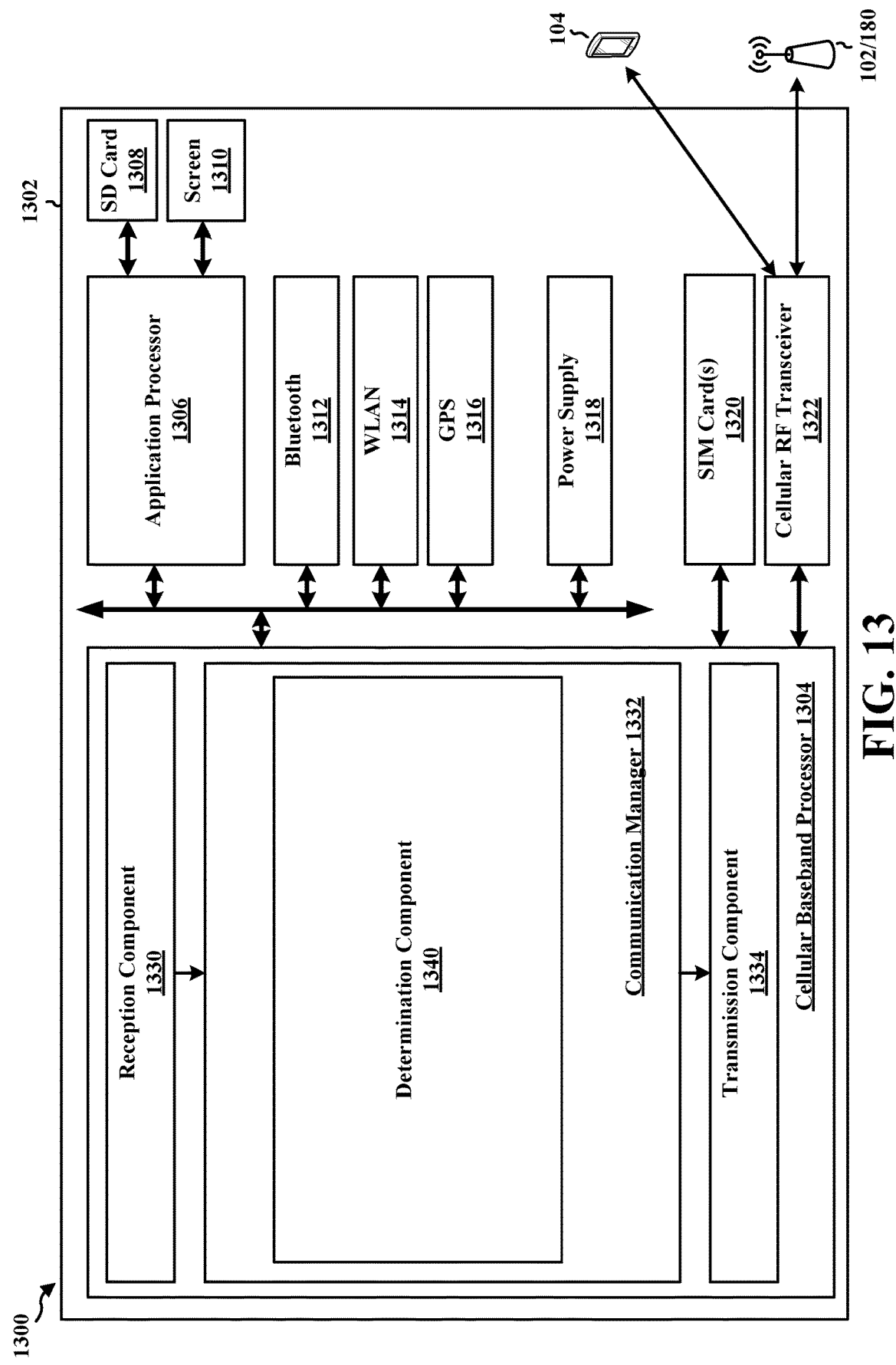
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a determination component 1340 that is configured to initiate the COT sharing procedure with at least one of the node or the base station, e.g., as described in connection with step 1002 above. Determination component 1340 may also be configured to determine a CCA threshold corresponding to at least one bandwidth, the at least one bandwidth being associated with a COT sharing procedure, e.g., as described in connection with step 1004 above. Determination component 1340 may also be configured to adjust the CCA threshold corresponding to the at least one bandwidth based on at least one of one or more sensing bandwidths or one or more granted resources for the COT sharing procedure, e.g., as described in connection with step 1006 above. Determination component 1340 may also be configured to calculate a difference between a UE sensing bandwidth of the one or more sensing bandwidths and a base station sensing bandwidth of the one or more sensing bandwidths, e.g., as described in connection with step 1008 above. Determination component 1340 may also be configured to adjust the at least one bandwidth based on the calculated difference between the UE sensing bandwidth and the base station sensing bandwidth, e.g., as described in connection with step 1010 above. Determination component 1340 may also be configured to signal the adjusted CCA threshold corresponding to the at least one bandwidth via the transmission medium to at least one of a node or a base station, e.g., as described in connection with step 1012 above. Determination component 1340 may also be configured to communicate at least one of uplink data or downlink data based on the adjusted CCA threshold corresponding to the at least one bandwidth, e.g., as described in connection with step 1014 above.

The apparatus may include additional components that perform each of the blocks of the algorithm in the aforementioned flowcharts of FIGS. 8, 9, and 10. As such, each block in the aforementioned flowcharts of FIGS. 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for determining a CCA threshold corresponding to at least one bandwidth associated with a COT sharing procedure. The apparatus 1302 may also include means for adjusting the CCA threshold corresponding to the at least one bandwidth based on at least one of one or more sensing bandwidths or one or more granted resources for the COT sharing procedure. The apparatus 1302 may also include means for signaling the adjusted CCA threshold corresponding to the at least one bandwidth via the transmission medium to at least one of a node or a base station. The apparatus 1302 may also include means for initiating the COT sharing procedure with at least one of the node or the base station. The apparatus 1302 may also include means for calculating a difference between a UE sensing bandwidth of the one or more sensing bandwidths and a base station sensing bandwidth of the one or more sensing bandwidths. The apparatus 1302 may also include means for adjusting the at least one bandwidth based on the calculated difference between the UE sensing bandwidth and the base station sensing bandwidth. The apparatus 1302 may also include means for communicating at least one of uplink data or downlink data based on the adjusted CCA threshold corresponding to the at least one bandwidth. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
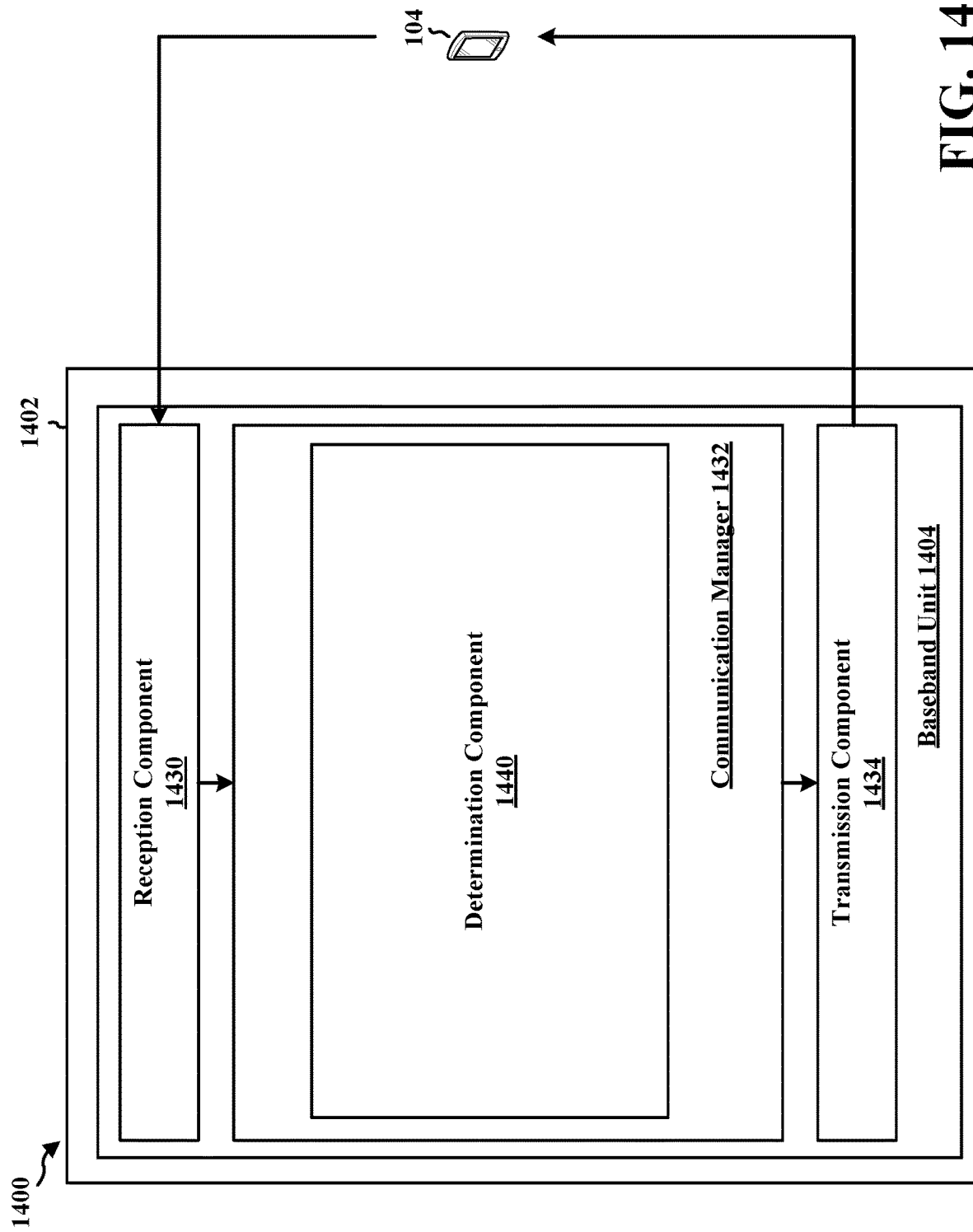
FIG. 14 is a diagram illustrating an example of a hardware implementation for an example apparatus.

FIG. 14 is a diagram 1400 illustrating an example of a hardware implementation for an apparatus 1402. The apparatus 1402 is a base station and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a determination component 1440 that is configured to initiate the COT sharing procedure with at least one of the node or the base station, e.g., as described in connection with step 1202 above. Determination component 1440 may also be configured to determine a clear channel assessment (CCA) threshold corresponding to at least one bandwidth, the at least one bandwidth being associated with a channel occupancy time (COT) sharing procedure, e.g., as described in connection with step 1204 above. Determination component 1440 may also be configured to adjust the CCA threshold corresponding to the at least one bandwidth based on at least one of one or more sensing bandwidths or one or more granted resources for the COT sharing procedure, e.g., as described in connection with step 1206 above. Determination component 1440 may also be configured to calculate a difference between a UE sensing bandwidth of the one or more sensing bandwidths and a base station sensing bandwidth of the one or more sensing bandwidths, e.g., as described in connection with step 1208 above. Determination component 1440 may also be configured to adjust the at least one bandwidth based on the calculated difference between the UE sensing bandwidth and the base station sensing bandwidth, e.g., as described in connection with step 1210 above. Determination component 1440 may also be configured to signal the adjusted CCA threshold corresponding to the at least one bandwidth to at least one of a node or a UE, e.g., as described in connection with step 1212 above. Determination component 1440 may also be configured to communicate at least one of uplink data or downlink data based on the adjusted CCA threshold corresponding to the at least one bandwidth, e.g., as described in connection with step 1214 above. Determination component 1440 may also be configured to configure one or more granted resources for a COT sharing procedure.

The apparatus may include additional components that perform each of the blocks of the algorithm in the aforementioned flowcharts of FIGS. 8, 11, and 12. As such, each block in the aforementioned flowcharts of FIGS. 8, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for determining a clear channel assessment (CCA) threshold corresponding to at least one bandwidth, the at least one bandwidth being associated with a channel occupancy time (COT) sharing procedure. The apparatus 1402 may also include means for adjusting the CCA threshold corresponding to the at least one bandwidth based on at least one of one or more sensing bandwidths or one or more granted resources for the COT sharing procedure. The apparatus 1402 may also include means for signaling the adjusted CCA threshold corresponding to the at least one bandwidth to at least one of a node or a UE. The aforementioned means may be one or more of the aforementioned components of the apparatus 1402 configured to perform the functions recited by the aforementioned means. The apparatus 1402 may also include means for initiating the COT sharing procedure with at least one of the node or the base station. The apparatus 1402 may also include means for calculating a difference between a UE sensing bandwidth of the one or more sensing bandwidths and a base station sensing bandwidth of the one or more sensing bandwidths. The apparatus 1402 may also include means for adjusting the at least one bandwidth based on the calculated difference between the UE sensing bandwidth and the base station sensing bandwidth. The apparatus 1402 may also include means for communicating at least one of uplink data or downlink data based on the adjusted CCA threshold corresponding to the at least one bandwidth. The apparatus 1402 may also include means for configuring one or more granted resources for a COT sharing procedure. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: determine a clear channel assessment (CCA) threshold corresponding to at least one bandwidth, the at least one bandwidth being associated with a channel occupancy time (COT) sharing procedure; adjust the CCA threshold corresponding to the at least one bandwidth based on at least one of one or more sensing bandwidths or one or more granted resources for the COT sharing procedure; and signal the adjusted CCA threshold corresponding to the at least one bandwidth to at least one of a node or a base station.

Aspect 2 is the apparatus of aspect 1, where the CCA threshold is adjusted based on a ratio of a reference bandwidth and a transmission bandwidth.

Aspect 3 is the apparatus of any of aspects 1 and 2, where the CCA threshold is adjusted based on a ratio of a base station sensing bandwidth and a UE sensing bandwidth.

Aspect 4 is the apparatus of any of aspects 1 to 3, where the CCA threshold is adjusted based on at least one of a transmit power, a transmit equivalent isotropic radiated power (EIRP), or a transmit power spectral density (PSD).

Aspect 5 is the apparatus of any of aspects 1 to 4, where the adjusted CCA threshold is explicitly signaled via uplink control information (UCI) or downlink control information (DCI).

Aspect 6 is the apparatus of any of aspects 1 to 5, where the adjusted CCA threshold is implicitly signaled via at least one of one or more sensing thresholds or the one or more sensing bandwidths.

Aspect 7 is the apparatus of any of aspects 1 to 6, where the at least one processor is further configured to: calculate a difference between a UE sensing bandwidth of the one or more sensing bandwidths and a base station sensing bandwidth of the one or more sensing bandwidths.

Aspect 8 is the apparatus of any of aspects 1 to 7, where the at least one processor is further configured to: adjust the at least one bandwidth based on the calculated difference between the UE sensing bandwidth and the base station sensing bandwidth.

Aspect 9 is the apparatus of any of aspects 1 to 8, where the difference between the UE sensing bandwidth and the base station sensing bandwidth includes a difference between at least one of a transmit power, a transmit equivalent isotropic radiated power (EIRP), or a transmit power spectral density (PSD).

Aspect 10 is the apparatus of any of aspects 1 to 9, where the at least one processor is further configured to: communicate at least one of uplink data or downlink data based on the adjusted CCA threshold corresponding to the at least one bandwidth.

Aspect 11 is the apparatus of any of aspects 1 to 10, where the one or more granted resources for the COT sharing procedure correspond to at least one of uplink resources or downlink resources.

Aspect 12 is the apparatus of any of aspects 1 to 11, where the at least one bandwidth includes at least one of a reference bandwidth, a static bandwidth, or a transmission bandwidth.

Aspect 13 is the apparatus of any of aspects 1 to 12, where the at least one processor is further configured to: initiate the COT sharing procedure with at least one of the node or the base station.

Aspect 14 is the apparatus of any of aspects 1 to 13, where the one or more granted resources are configured for the COT sharing procedure.

Aspect 15 is the apparatus of any of aspects 1 to 14, where adjusting the CCA threshold includes increasing the CCA threshold or decreasing the CCA threshold.

Aspect 16 is the apparatus of any of aspects 1 to 15, where the UE is an initiator node or a sharing node in the COT sharing procedure.

Aspect 17 is the apparatus of any of aspects 1 to 16, further including a transceiver coupled to the at least one processor.

Aspect 18 is a method of wireless communication for implementing any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

Aspect 21 is an apparatus for wireless communication at a base station including at least one processor coupled to a memory and configured to: determine a clear channel assessment (CCA) threshold corresponding to at least one bandwidth, the at least one bandwidth being associated with a channel occupancy time (COT) sharing procedure; adjust the CCA threshold corresponding to the at least one bandwidth based on at least one of one or more sensing bandwidths or one or more granted resources for the COT sharing procedure; and signal the adjusted CCA threshold corresponding to the at least one bandwidth to at least one of a node or a user equipment (UE).

Aspect 22 is the apparatus of aspect 21, where the CCA threshold is adjusted based on a ratio of a reference bandwidth and a transmission bandwidth.

Aspect 23 is the apparatus of any of aspects 21 and 22, where the CCA threshold is adjusted based on a ratio of a base station sensing bandwidth and a UE sensing bandwidth.

Aspect 24 is the apparatus of any of aspects 21 to 23, where the CCA threshold is adjusted based on at least one of a transmit power, a transmit equivalent isotropic radiated power (EIRP), or a transmit power spectral density (PSD).

Aspect 25 is the apparatus of any of aspects 21 to 24, where the adjusted CCA threshold is explicitly signaled via downlink control information (DCI) or uplink control information (UCI).

Aspect 26 is the apparatus of any of aspects 21 to 25, where the adjusted CCA threshold is implicitly signaled via at least one of one or more sensing thresholds or the one or more sensing bandwidths.

Aspect 27 is the apparatus of any of aspects 21 to 26, where the at least one processor is further configured to: calculate a difference between a UE sensing bandwidth of the one or more sensing bandwidths and a base station sensing bandwidth of the one or more sensing bandwidths.

Aspect 28 is the apparatus of any of aspects 21 to 27, where the at least one processor is further configured to: adjust the at least one bandwidth based on the calculated difference between the UE sensing bandwidth and the base station sensing bandwidth.

Aspect 29 is the apparatus of any of aspects 21 to 28, where the difference between the UE sensing bandwidth and the base station sensing bandwidth includes a difference between at least one of a transmit power, a transmit equivalent isotropic radiated power (EIRP), or a transmit power spectral density (PSD).

Aspect 30 is the apparatus of any of aspects 21 to 29, where the at least one processor is further configured to: communicate at least one of downlink data or uplink data based on the adjusted CCA threshold corresponding to the at least one bandwidth.

Aspect 31 is the apparatus of any of aspects 21 to 30, where the one or more granted resources for the COT sharing procedure correspond to at least one of downlink resources or uplink resources.

Aspect 32 is the apparatus of any of aspects 21 to 31, where the at least one bandwidth includes at least one of a reference bandwidth, a static bandwidth, or a transmission bandwidth.

Aspect 33 is the apparatus of any of aspects 21 to 32, where the at least one processor is further configured to: initiate the COT sharing procedure with at least one of the node or the UE.

Aspect 34 is the apparatus of any of aspects 21 to 33, where the at least one processor is further configured to: configure the one or more granted resources for the COT sharing procedure.

Aspect 35 is the apparatus of any of aspects 21 to 34, where adjusting the CCA threshold includes increasing the CCA threshold or decreasing the CCA threshold.

Aspect 36 is the apparatus of any of aspects 21 to 35, where the base station is an initiator node or a sharing node in the COT sharing procedure.

Aspect 37 is the apparatus of any of aspects 21 to 36, further including a transceiver coupled to the at least one processor.

Aspect 38 is a method of wireless communication for implementing any of aspects 21 to 37.

Aspect 39 is an apparatus for wireless communication including means for implementing any of aspects 21 to 37.

Aspect 40 is a computer-readable medium storing computer executable code, where the code when executed by a processor causes the processor to implement any of aspects 21 to 37.

What is claimed is:

1. A method of wireless communication at a user equipment (UE), comprising:
    determining a clear channel assessment (CCA) threshold corresponding to at least one bandwidth, the at least one bandwidth being associated with a channel occupancy time (COT) sharing procedure;
    adjusting the CCA threshold corresponding to the at least one bandwidth based on at least one of one or more sensing bandwidths over which energy is measured for a channel access determination or one or more granted resources for the COT sharing procedure, wherein the at least one bandwidth includes a base station transmission bandwidth that is within a UE sensing bandwidth included in the one or more sensing bandwidths;
    signaling the adjusted CCA threshold corresponding to the at least one bandwidth to at least one of a node or a base station;
    calculating a difference between the UE sensing bandwidth of the one or more sensing bandwidths and a base station sensing bandwidth of the one or more sensing bandwidths; and
    adjusting the at least one bandwidth based on the calculated difference between the UE sensing bandwidth and the base station sensing bandwidth,
    wherein the difference between the UE sensing bandwidth and the base station sensing bandwidth includes a difference between at least one of a transmit power, a transmit equivalent isotropic radiated power (EIRP), or a transmit power spectral density (PSD).

2. The method of claim 1, wherein the CCA threshold is adjusted based on a ratio of a reference bandwidth and a transmission bandwidth.

3. The method of claim 1, wherein the CCA threshold is adjusted based on a ratio of a base station sensing bandwidth and the UE sensing bandwidth.

4. The method of claim 1, wherein the CCA threshold is adjusted based on at least one of a transmit power, a transmit equivalent isotropic radiated power (EIRP), or a transmit power spectral density (PSD).

5. The method of claim 1, wherein the adjusted CCA threshold is explicitly signaled via uplink control information (UCI) or downlink control information (DCI).

6. The method of claim 1, wherein the adjusted CCA threshold is implicitly signaled via at least one of one or more sensing thresholds or the one or more sensing bandwidths.

7. The method of claim 1, further comprising:
    communicating at least one of uplink data or downlink data based on the adjusted CCA threshold corresponding to the at least one bandwidth.

8. The method of claim 1, wherein the one or more granted resources for the COT sharing procedure correspond to at least one of uplink resources or downlink resources.

9. The method of claim 1, wherein the at least one bandwidth includes at least one of a reference bandwidth, a static bandwidth, or a transmission bandwidth, wherein the one or more granted resources are configured for the COT sharing procedure.

10. The method of claim 1, further comprising:
    initiating the COT sharing procedure with at least one of the node or the base station, wherein the UE is an initiator node or a sharing node in the COT sharing procedure.

11. An apparatus for wireless communication at a user equipment (UE), comprising:
    memory; and
    at least one processor coupled to the memory and configured to:
        determine a clear channel assessment (CCA) threshold corresponding to at least one bandwidth, the at least one bandwidth being associated with a channel occupancy time (COT) sharing procedure;
        adjust the CCA threshold corresponding to the at least one bandwidth based on at least one of one or more sensing bandwidths for energy measurement for channel access determination or one or more granted resources for the COT sharing procedure, wherein the at least one bandwidth includes a base station transmission bandwidth that is within a UE sensing bandwidth included in the one or more sensing bandwidths;
        signal the adjusted CCA threshold corresponding to the at least one bandwidth to at least one of a node or a base station;
        calculate a difference between the UE sensing bandwidth of the one or more sensing bandwidths and a base station sensing bandwidth of the one or more sensing bandwidths; and adjust the at least one bandwidth based on the calculated difference between the UE sensing bandwidth and the base station sensing bandwidth,
wherein the difference between the UE sensing bandwidth and the base station sensing bandwidth includes a difference between at least one of a transmit power, a transmit equivalent isotropic radiated power (EIRP), or a transmit power spectral density (PSD).

12. The apparatus of claim 11, wherein to adjust the CCA threshold, the at least one processor is configured to adjust the CCA threshold based on a ratio of a reference bandwidth and a transmission bandwidth.

13. The apparatus of claim 11, wherein to adjust the CCA threshold, the at least one processor is configured to adjust the CCA threshold based on a ratio of a base station sensing bandwidth and the UE sensing bandwidth.

14. The apparatus of claim 11, wherein to adjust the CCA threshold, the at least one processor is configured to adjust the CCA threshold based on at least one of a transmit power, a transmit equivalent isotropic radiated power (EIRP), or a transmit power spectral density (PSD).

15. The apparatus of claim 11, wherein to signal the adjusted CCA threshold, the at least one processor is configured to explicitly signal the adjusted CCA threshold via uplink control information (UCI) or downlink control information (DCI).

16. The apparatus of claim 11, wherein to signal the adjusted CCA threshold, the at least one processor is configured to implicitly signal the adjusted CCA threshold via at least one of one or more sensing thresholds or the one or more sensing bandwidths.

17. The apparatus of claim 11, wherein the at least one processor is further configured to:
communicate at least one of uplink data or downlink data based on the adjusted CCA threshold corresponding to the at least one bandwidth, further comprising a transceiver coupled to the at least one processor.

18. The apparatus of claim 11, wherein the one or more granted resources for the COT sharing procedure correspond to at least one of uplink resources or downlink resources.

19. The apparatus of claim 11, wherein the at least one bandwidth includes at least one of a reference bandwidth, a static bandwidth, or a transmission bandwidth, wherein the one or more granted resources are configured for the COT sharing procedure.

20. The apparatus of claim 11, wherein the at least one processor is further configured to:
initiate the COT sharing procedure with at least one of the node or the base station, wherein the UE is an initiator node or a sharing node in the COT sharing procedure.

21. A method of wireless communication at a base station, comprising:
determining a clear channel assessment (CCA) threshold corresponding to at least one bandwidth, the at least one bandwidth being associated with a channel occupancy time (COT) sharing procedure;
adjusting the CCA threshold corresponding to the at least one bandwidth based on at least one of one or more sensing bandwidths over which energy is measured for a channel access determination or one or more granted resources for the COT sharing procedure, wherein the at least one bandwidth includes a base station transmission bandwidth that is within a UE sensing bandwidth included in the one or more sensing bandwidths;
signaling the adjusted CCA threshold corresponding to the at least one bandwidth to at least one of a node or a user equipment (UE);
calculating a difference between the UE sensing bandwidth of the one or more sensing bandwidths and a base station sensing bandwidth of the one or more sensing bandwidths; and
adjusting the at least one bandwidth based on the calculated difference between the UE sensing bandwidth and the base station sensing bandwidth,
wherein the difference between the UE sensing bandwidth and the base station sensing bandwidth includes a difference between at least one of a transmit power, a transmit equivalent isotropic radiated power (EIRP), or a transmit power spectral density (PSD).

22. The method of claim 21, further comprising:
communicating at least one of downlink data or uplink data based on the adjusted CCA threshold corresponding to the at least one bandwidth,
wherein the one or more granted resources for the COT sharing procedure correspond to at least one of downlink resources or uplink resources, wherein the at least one bandwidth includes at least one of a reference bandwidth, a static bandwidth, or a transmission bandwidth.

23. The method of claim 21, further comprising:
initiating the COT sharing procedure with at least one of the node or the UE, wherein the base station is an initiator node or a sharing node in the COT sharing procedure.

24. An apparatus for wireless communication at a base station, comprising:
memory; and
at least one processor coupled to the memory and configured to:
determine a clear channel assessment (CCA) threshold corresponding to at least one bandwidth, the at least one bandwidth being associated with a channel occupancy time (COT) sharing procedure;
adjust the CCA threshold corresponding to the at least one bandwidth based on at least one of one or more sensing bandwidths for energy measurement for channel access determination or one or more granted resources for the COT sharing procedure, wherein the at least one bandwidth includes a base station transmission bandwidth that is within a UE sensing bandwidth included in the one or more sensing bandwidths;
signal the adjusted CCA threshold corresponding to the at least one bandwidth to at least one of a node or a user equipment (UE);
calculate a difference between the UE sensing bandwidth of the one or more sensing bandwidths and a base station sensing bandwidth of the one or more sensing bandwidths; and
adjust the at least one bandwidth based on the calculated difference between the UE sensing bandwidth and the base station sensing bandwidth,
wherein the difference between the UE sensing bandwidth and the base station sensing bandwidth includes a difference between at least one of a transmit power, a transmit equivalent isotropic radiated power (EIRP), or a transmit power spectral density (PSD).

25. The apparatus of claim 24, wherein the at least one processor is further configured to:
communicate at least one of downlink data or uplink data based on the adjusted CCA threshold corresponding to the at least one bandwidth, further comprising a transceiver coupled to the at least one processor,
wherein the one or more granted resources for the COT sharing procedure correspond to at least one of downlink resources or uplink resources, wherein the at least one bandwidth includes at least one of a reference bandwidth, a static bandwidth, or a transmission bandwidth.

26. The apparatus of claim 24, wherein the at least one processor is further configured to:
initiate the COT sharing procedure with at least one of the node or the UE, wherein the base station is an initiator node or a sharing node in the COT sharing procedure.

\* \* \* \* \*